(12) United States Patent
Yamashita et al.

(10) Patent No.: US 11,650,365 B2
(45) Date of Patent: *May 16, 2023

(54) SURFACE LIGHT SOURCE

(71) Applicant: NICHIA CORPORATION, Anan (JP)

(72) Inventors: Ryohei Yamashita, Tokushima (JP);
Toshinobu Katsumata, Fujiyoshida (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,385

(22) Filed: Jul. 11, 2022

(65) Prior Publication Data

US 2022/0342143 A1 Oct. 27, 2022

Related U.S. Application Data

(63) Continuation of application No. 17/466,984, filed on Sep. 3, 2021, now Pat. No. 11,415,741.

(30) Foreign Application Priority Data

Sep. 7, 2020 (JP) .............................. JP2020-150117

(51) Int. Cl.
*F21V 8/00* (2006.01)
*G02F 1/1335* (2006.01)

(52) U.S. Cl.
CPC ........... *G02B 6/0083* (2013.01); *G02B 6/009* (2013.01); *G02B 6/0068* (2013.01);
(Continued)

(58) Field of Classification Search
CPC .... G02B 6/0083; G02B 6/0068; G02B 6/009; G02B 6/0073; G02F 1/133612; G02F 1/133524
See application file for complete search history.

(56) References Cited

U.S. PATENT DOCUMENTS 7,273,311 B2 * 9/2007 Yu .................... G02B 6/0013
362/626
10,539,733 B2 * 1/2020 Yamamoto ........... G02B 6/0073
(Continued)

FOREIGN PATENT DOCUMENTS

JP 2007-329114 A 12/2007
JP 2009-063684 A 3/2009
(Continued)

OTHER PUBLICATIONS

Notice of Allowance in U.S. Appl. No. 17/466,984, dated Apr. 13, 2022.
(Continued)

*Primary Examiner* — Mary Ellen Bowman
(74) *Attorney, Agent, or Firm* — Foley & Lardner LLP

(57) ABSTRACT

A surface light source includes: a light guide plate having an upper surface and a lower surface located opposite the upper surface, and including at least one through hole extending from the upper surface to the lower surface; a wiring substrate located on a lower surface side of the light guide plate and including a wiring layer; and at least one light source including a light-emitting element electrically connected to the wiring layer of the wiring substrate. The light source is located inside the through hole. The upper surface of the light guide plate has a first region including a plurality of depressed portions.

20 Claims, 14 Drawing Sheets

(52) U.S. Cl.
CPC ...... *G02B 6/0073* (2013.01); *G02F 1/133524* (2013.01); *G02F 1/133612* (2021.01)

(56) References Cited

U.S. PATENT DOCUMENTS

| | | | |
|---|---|---|---|
| 11,415,741 B2* | 8/2022 | Yamashita | G02F 1/133606 |
| 2001/0024249 A1* | 9/2001 | Moon | G02F 1/133553 |
| | | | 349/65 |
| 2003/0223218 A1* | 12/2003 | Kawakami | G02B 6/0061 |
| | | | 362/612 |
| 2009/0059125 A1 | 3/2009 | Nagayoshi et al. | |
| 2010/0188601 A1* | 7/2010 | Onishi | G02B 6/0088 |
| | | | 349/61 |
| 2011/0037740 A1 | 2/2011 | Yamaguchi | |
| 2011/0149594 A1* | 6/2011 | Terajima | G02F 1/133603 |
| | | | 362/606 |
| 2011/0194034 A1* | 8/2011 | Shimizu | G02B 6/0036 |
| | | | 348/739 |
| 2016/0357269 A1* | 12/2016 | Tai | G06F 3/0202 |
| 2019/0049649 A1 | 2/2019 | Hayashi et al. | |
| 2020/0049877 A1 | 2/2020 | Watanabe et al. | |
| 2021/0341666 A1* | 11/2021 | Lu | G02B 6/0021 |

FOREIGN PATENT DOCUMENTS

| | | | |
|---|---|---|---|
| JP | 2010-067568 | A | 3/2010 |
| JP | 2011-039122 | A | 2/2011 |
| JP | 2011-096494 | A | 5/2011 |
| JP | 2011-210674 | A | 10/2011 |
| JP | 2015-509655 | A | 3/2015 |
| JP | 2018-101521 | A | 6/2018 |
| JP | 2019-012681 | A | 1/2019 |
| JP | 2020-009556 | A | 1/2020 |
| JP | 2020-109783 | A | 7/2020 |
| WO | WO-2010/058625 | A1 | 5/2010 |
| WO | WO-2010/070885 | A1 | 6/2010 |
| WO | WO-2013/134017 | A1 | 9/2013 |
| WO | WO-2019/033782 | A1 | 2/2019 |
| WO | WO-2020/101038 | A1 | 5/2020 |

OTHER PUBLICATIONS

Non-Final Office Action in U.S. Appl. No. 17/466,984, dated Dec. 27, 2021.

\* cited by examiner

SURFACE LIGHT SOURCE

CROSS-REFERENCE TO RELATED APPLICATION

This application is a continuation of U.S. patent application Ser. No. 17/466,984, filed on Sep. 3, 2021, which claims priority to Japanese Patent Application No. 2020-150117, filed on Sep. 7, 2020. The disclosures of these applications are hereby incorporated by reference in their entireties.

BACKGROUND

The present disclosure relates to a surface light source.

Japanese Patent Publication No. 2011-210674 discloses a light-emitting device in which a light guide plate with a plurality of holes provided therein is arranged on a substrate to which a plurality of LED elements are connected. Japanese Patent Publication No. 2009-063684 discloses an optical unit in which a plurality of optical elements are arranged on the upper surface side of a plurality of LEDs arranged in an array on a substrate. In the optical unit of Japanese Patent Publication No. 2009-063684, a lens array is arranged so as to surround a concave shape formed directly above the LED on the light-emitting surface of each optical element.

SUMMARY

The present disclosure provides a surface light source of which brightness non-uniformity is suppressed.

A surface light source according to an embodiment of the present disclosure includes: a light guide plate having an upper surface and a lower surface located on an opposite side of the upper surface, and including at least one through hole running through from the upper surface to the lower surface; a wiring substrate located on a side of the lower surface of the light guide plate and including a wiring layer; and at least one light source including a light-emitting element electrically connected to the wiring layer of the wiring substrate, wherein: the light source is located inside the through hole; the upper surface of the light guide plate has a first region including a plurality of protruding portions or depressed portions; and an proportion of the area of the protruding portions or depressed portions per unit area in a plan view increases among concentric parts of the first region in a direction away from the light source.

Certain embodiments of the present disclosure provide a surface light source of which brightness non-uniformity is suppressed.

DETAILED DESCRIPTION

Figure 1:
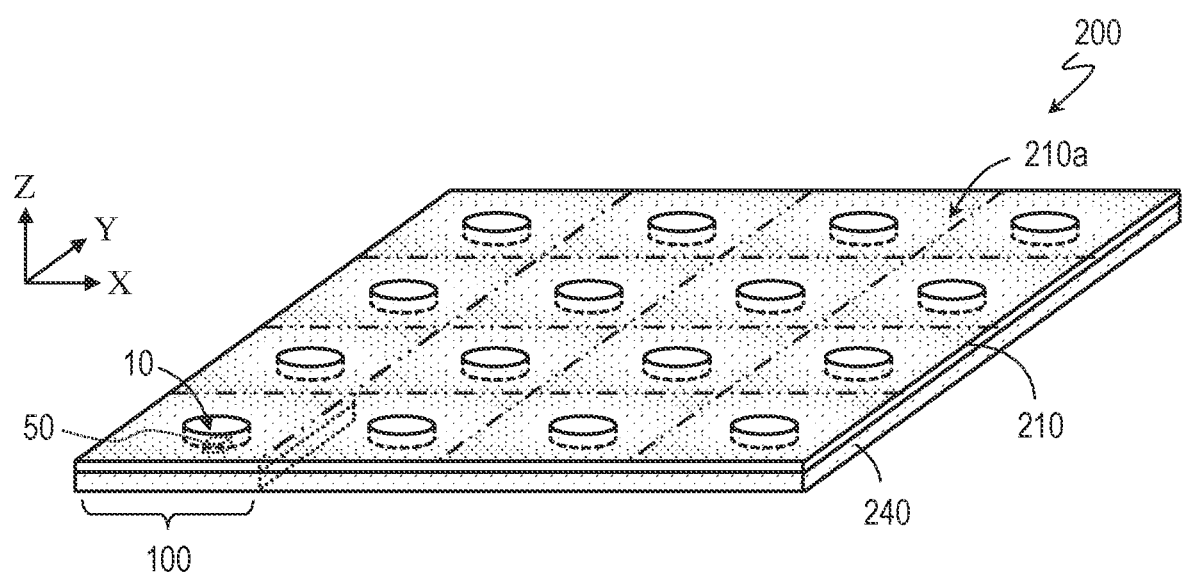
FIG. 1 is a schematic perspective view showing an illustrative configuration of a surface light source according to an embodiment of the present disclosure.

Embodiments of the present disclosure will now be described with reference to the drawings. The following embodiments are illustrative, and a surface light source of the present disclosure is not limited thereto. For example, the numerical values, shapes, materials, steps, and the order of steps, etc. shown in the following embodiments are merely examples, and various modifications can be made thereto so long as they do not lead to technical contradictions. The embodiments described below are merely illustrative, and various combinations are possible as long as they do not lead to technical contradictions.

The size, the shape, etc., of the components shown in the figures may be exaggerated for ease of understanding, and may not represent the size and the shape of the components and the size relationship therebetween in an actual surface light source. Some components may be omitted in order to prevent the figures from becoming overly complicated.

In the following description, components having like functions may be denoted by like reference characters, and redundant descriptions may be omitted. Terms indicating specific directions and positions (e.g., "upper," "lower," "right," "left," and other terms including such terms) may be used in the following description. However, these terms are used merely for the ease of understanding relative directions or positions in the figure being referred to. The arrangement of components in figures from documents other than the present disclosure, actual products, actual manufacturing apparatuses, etc., does not need to be equal to that shown in the figure being referred to, as long as it conforms with the directional or positional relationship as indicated by terms such as "upper" and "lower" in the figure being referred to. In the present disclosure, the term "parallel" encompasses cases where two straight lines, sides, planes, etc., are in the range of about 0±5°, unless otherwise specified. In the present disclosure, the term "perpendicular" or "orthogonal" encompasses cases where two straight lines, sides, planes, etc., are in the range of about 90±5°, unless otherwise specified.

First Embodiment

FIG. 1 shows an illustrative configuration of a surface light source according to one embodiment of the present disclosure. A surface light source 200 shown in FIG. 1 includes a light guide plate 210 having an upper surface 210a, a wiring substrate 240 located below the light guide plate 210 and a plurality of light sources 50. As will be described below, each light source 50 includes a light-emitting element such as an LED. Note that FIG. 1A also shows arrows in the X direction, the Y direction and the Z direction, which are orthogonal to each other, for the purpose of illustration. Arrows indicating these directions may be also shown in other figures of the present disclosure.

The surface light source 200 has a plate shape as a whole. The upper surface 210a of the light guide plate 210, which forms the light-emitting surface of the surface light source 200, typically has a rectangular shape. Here, the X and Y directions described above correspond respectively to one and the other of the mutually orthogonal sides of the rectangular shape of the upper surface 210a of the light guide plate 210. The length of each side of the rectangular shape of the upper surface 210a is in the range of 20 cm or more and 40 cm or less, for example.

In the configuration illustrated in FIG. 1, the surface light source 200 includes a plurality of light-emitting regions 100, each including at least one light source 50. As schematically shown in FIG. 1, the surface light source 200 includes a total of 16 light-emitting regions 100 arranged in four rows and four columns in this example. There is no limitation on the number of light-emitting regions 100 included in the surface light source 200 and the arrangement of these light-emitting regions 100, and they are not limited to the configuration shown in FIG. 1. For example, the surface light source 200 may be composed of a one-dimensional array of two or more light-emitting regions 100. The surface light source 200 may possibly be composed of a single light-emitting region 100.

As shown in FIG. 1, each light-emitting region 100 has a through hole 10 including, as a part thereof, an opening that is located on the upper surface 210a of the light guide plate 210. The light source 50 of each light-emitting region 100 is located inside the through hole 10. In this example, the light sources 50 are arranged in four rows and four columns on the wiring substrate 240 along the X direction and the Y direction in accordance with the arrangement of the light-emitting regions 100 in four rows and four columns.

The arrangement pitch of the light sources 50 may be about 7.5 mm or more and 10.0 mm less, for example, and may be in the range of about 8.0 mm or more and 9.5 mm or less. As used herein, the arrangement pitch of the light sources 50 means the distance between optical axes of the light sources 50. The optical axis of a light source 50 refers to an axis that is perpendicular to the upper surface of the light-emitting element included in the light source 50 and that passes through the center of the upper surface of the light-emitting element in a plan view, or an axis that is perpendicular to the upper surface of the light source 50 and that passes through the center of the upper surface of the light source 50 in a plan view. The light sources 50 may be arranged equidistantly or may be arranged non-equidistantly on the wiring substrate 240. The arrangement pitch of the light sources 50 may be the same or different between two different directions.

Figure 2:
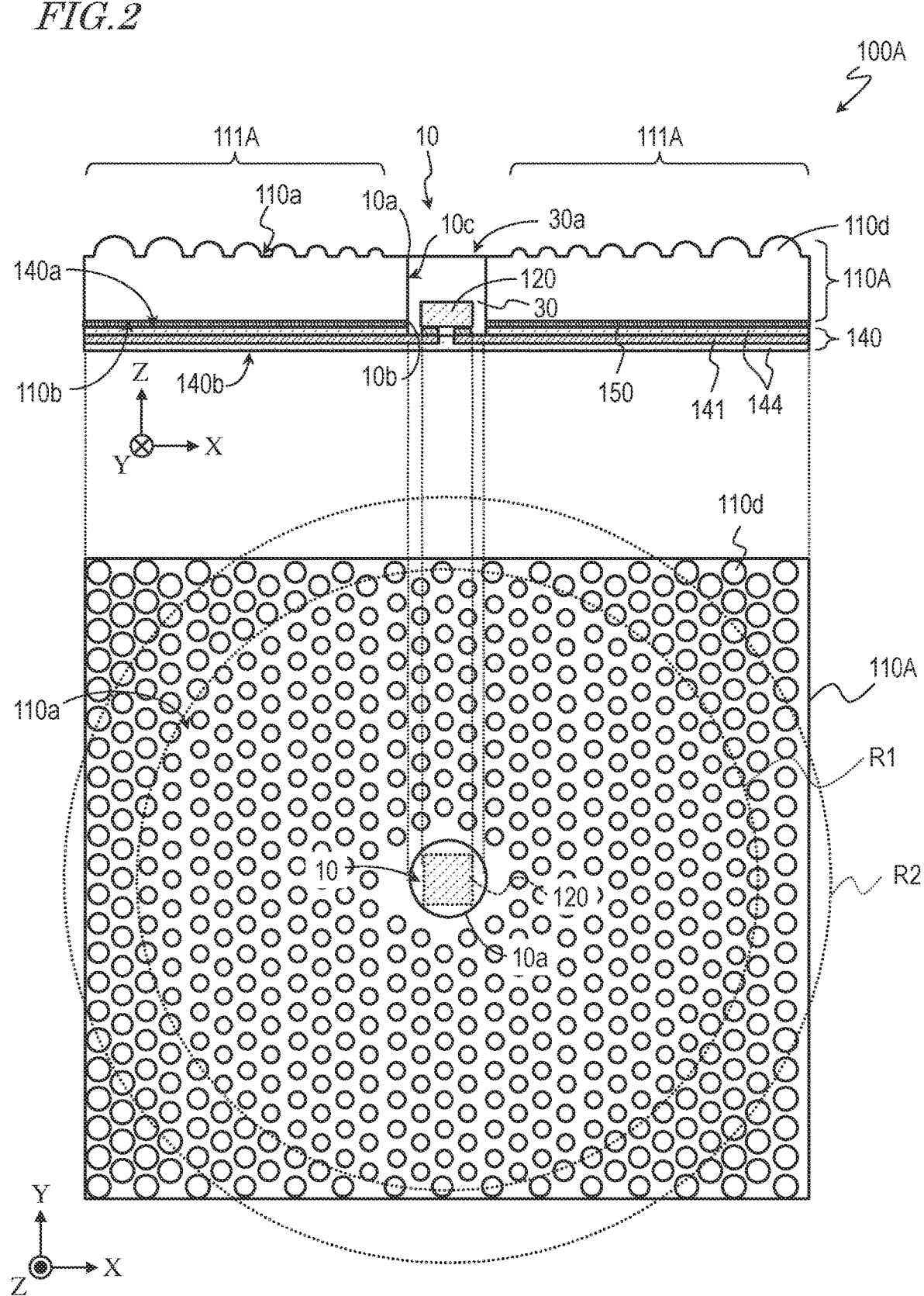
FIG. 2 shows a schematic cross section of an example of a light-emitting region of the surface light source shown in FIG. 1, and schematically shows the external appearance as viewed from the upper surface side of the light guide plate.

FIG. 2 shows a light-emitting region 100A, which is an example of the light-emitting region 100. FIG. 2 shows, as a single figure, a schematic cross section of the light-emitting region 100A taken in a direction perpendicular to the upper surface 210a of the light guide plate 210 in the vicinity of the center of the light-emitting region 100A, together with an illustrative external appearance of the light-emitting region 100A as viewed perpendicular to the upper surface 210a from the upper surface 210a side of the light guide plate 210.

The light-emitting region 100A generally includes a light guide plate 110A, a light source 50 and a wiring substrate 140. As shown in the upper part of FIG. 2, the light guide plate 110A has an upper surface 110a and a lower surface 110b that is on the opposite side of the upper surface 110a, and the wiring substrate 140 is located on the lower surface 110b side of the light guide plate 110A. The light guide plate 110A is provided with a through hole 10 that includes an opening 10a located at the upper surface 110a. The light guide plate 110A is a part of the light guide plate 210 shown in FIG. 1, and the through hole 10 of the light guide plate 110A illustrates one of a plurality of through holes 10 shown in FIG. 1.

Here, the through hole 10 has a generally cylindrical shape. As shown in the upper part of FIG. 2, the through hole 10 includes, in addition to the opening 10a, an opening 10b that is located at the lower surface 110b of the light guide plate 110 and a side surface 10c that is located between the opening 10a and the opening 10b. The side surface of the through hole is an inner surface of the light guide plate that defines the shape of the through hole. It is understood that the specific shape of the through hole 10 is not limited to this example.

A light-emitting element 120 is located inside the through hole 10. In this example, a portion of the space inside the through hole 10 that excludes the light-emitting element 120 is filled with a first light-transmissive member 30. That is, in this example, the light-emitting element 120 is covered by the first light-transmissive member 30.

The wiring substrate 140 shown in FIG. 2 is a part of the wiring substrate 240 shown in FIG. 1, and includes one or more wiring layer 141 and an insulating portion 144 such as a resin. The wiring substrate 140 has an upper surface 140a and a lower surface 140b that is located on the opposite side of the upper surface 140a. Here, the light guide plate 110A is attached to the wiring substrate 140 by an adhesive sheet 150 interposed between the upper surface 140a of the wiring substrate 140 and the lower surface 110b of the light guide plate 110A. As will be described later, other functional layers such as a light-reflective resin sheet may be arranged between the adhesive sheet 150 and the wiring substrate 140. The light-emitting element 120 is electrically connected to the wiring layer 141 of the wiring substrate 140. Note that in the upper part of FIG. 2, the illustrative structure of the light-emitting region 100A is shown only schematically so as not to overly complicate the drawings. The details of the structure of the wiring substrate 140 will be described later.

The upper surface 110a of the light guide plate 110A has a first region 111A in which a plurality of protruding portions or depressed portions are formed in at least a portion thereof. The first region 111A is located in a region of the upper surface 110a that does not overlap with the through hole 10. In the example shown in FIG. 2, a plurality of protruding portions 110d are arranged in the first region 111A.

By providing a plurality of protruding portions 110d, for example, on a region of the surface of the upper surface 110a side of the light guide plate 110A that does not overlap with the through hole 10, it is possible to efficiently extract, through the first region 111A, light from the light-emitting element 120, which is introduced into the inside of the light guide plate 110A from the side surface 10c of the through hole 10. That is, it is possible to relatively improve the brightness in the first region 111A when viewed from the direction normal to the upper surface 110a of the light guide plate 110A.

In this example, as shown in the lower part of FIG. 2, the first region 111A occupies the entire region of the upper surface 110a that does not overlap with the through hole and a plurality of protruding portions 110d are formed therein. The portion of the first region 111A other than the protruding portions 110d is typically a flat surface. In the first region 111A, a flat surface may be formed in the region (ring-shaped region) between the through hole 10 and the protruding portion closest to the through hole, but it is even then assumed that the protruding portions 110d are formed across the entire first region 111A. Note that FIG. 2 is merely a schematic view for illustrating the structure of the upper surface 110a of the light guide plate 110A, and the number or shape of the protruding portions 110d, etc., may not strictly match between the cross-sectional view and the plan view. This similarly applies to the other drawings of the present disclosure.

As shown schematically in FIG. 2, the proportion of the area of the protruding portions 110d per unit area of the first region 111A increases among concentric parts of the first region in a direction away from the light-emitting element 120. In this example, each of the protruding portions 110d has a circular outer shape in a plan view. The diameter of the circular shape of the protruding portion 110d may increase stepwise or gradually in the direction away from the center of the light guide plate 110A. More specifically, as compared to protruding portions 110d in the region sandwiched between a virtual circle R1 that is denoted by a dotted line in FIG. 2 and that is centered at the position of the light-emitting element 120 and the opening 10a of the through hole 10, the protruding portions 110d in the region sandwiched between the circle R1 and a virtual circle R2 having a larger diameter than the circle R1 have larger diameters. Furthermore, the diameter of the protruding portions 110d that are in the region outside the circle R2 is larger than the diameter of the protruding portions 110d in the region sandwiched between the circle R1 and the circle R2. As can be seen from the configuration shown in FIG. 2, the diameter of the protruding portions 110d does not need to uniformly increase in the direction away from the light-emitting element 120. The protruding portions 110d in the region sandwiched between the virtual circle R1 that is centered at the position of the light-emitting element 120 and the opening 10a of the through hole 10 may have an equal diameter. The protruding portions 110d in the region sandwiched between the circle R1 and the virtual circle R2 having a larger diameter than the circle R1 may have an equal diameter.

According to a configuration in which the proportion of the area of the protruding portions 110d per unit area of the first region 111A increases among concentric parts of the first region in the direction away from the light source 50 (here, the light-emitting element 120) as illustrated in FIG. 2, it is possible to relatively increase the light emitted from a position away from the light source 50 on the upper surface 110a of the light guide plate 110A. For example, in this example, the protruding portions 110d arranged in the vicinity of the four corners of the upper surface 110a of the light guide plate 110A have the largest diameter among the protruding portions 110d provided in the first region 111A. Therefore, it is possible to relatively increase the brightness in the vicinity of the four corner portions of the upper surface 110a of the light guide plate 110A compared to other regions of the first region 111A.

As a result of improving the brightness in the region that is likely to be relatively dark, it is possible to more effectively suppress the brightness non-uniformity while suppressing the increase in thickness of the light guide plate 110A. The thickness of the surface light source, as a whole, according to the embodiment of the present disclosure, including the wiring substrate 140, may be in the range of 0.8 mm or more and 0.9 mm or less, for example.

Details of members in the light-emitting region 100A will now be described below.

[Light Guide Plate 110A]

The light guide plate 110A has the function of causing light from the light-emitting element 120 to propagate through the inside thereof to be emitted from the upper surface 110a. The upper surface 110a of the light guide plate 110A typically has a rectangular shape, as does the upper surface 210A of the light guide plate 210. In the present embodiment, a collection of the upper surfaces 110a of the light guide plates 110A forms the light-emitting surface of the surface light source 200.

The light guide plate 110A is a generally plate-shaped member formed from a thermoplastic resin such as acrylic, polycarbonate, cyclic polyolefin, polyethylene terephthalate, polyester, or a thermosetting resin such as epoxy, silicone, or the like, and is light-transmissive. Of these materials, polycarbonate in particular is capable of realizing a high degree of transparency while being inexpensive. Note that the term "light-transmissive" as used herein is construed to also include being diffusive to incident light, and is not limited to being "transparent." The light guide plate 110A may have a light-diffusing function by dispersing a material having a refractive index different from that of the base material, for example.

The light guide plate 110A may be a single layer or may have a stacked structure including a plurality of light-transmissive layers. These light-transmissive layers can be attached together by a light-transmissive adhesive layer. For example, the light guide plate 110A can be formed by stacking a plurality of resin sheets that share the same material.

The thickness of the light guide plate 110A, i.e., the distance from the lower surface 110b to the upper surface 110a, is typically about 200 µm or more and 800 µm or less.

According to the embodiment of the present disclosure, the thickness of the light guide plate 110A can be in the range of about 400 µm or more and 600 µm or less.

As described above, the light guide plate 110A has the through hole 10. Here, the shape of the side surface 10c of the through hole 10, as viewed in cross-sectional view, is generally straight. However, the shape of the side surface 10c, as viewed in cross-sectional view, is not limited to being straight, but may be a shape that includes bends and/or steps, or may be a curved line, etc.

The specific configuration of the through hole 10 may be determined as appropriate depending on the shape and characteristics, etc., of the light source 50 (here, the light-emitting element 120) arranged inside the through hole 10 in a plan view. In the configuration illustrated in FIGS. 1 and 2, the through hole 10 has a cylindrical shape. That is, the shape of the opening 10a and an opening 10b is circular. The size (diameter in this example) of the opening 10a and an opening 10b may be about 3 mm, for example. The size of each of the opening 10a and the opening 10b is determined appropriately depending on the shape of the light source 50 located in the through hole 10. Note that the shape of the through hole 10 is not limited to a cylindrical shape, but may be a prismatic shape, for example. The shape of the through hole 10 may be a truncated cone shape or an inverted truncated cone shape, or a truncated pyramidal shape or an inverted truncated pyramidal shape, etc.

As will be described below, the shape of the upper surface of the light source 50 (here, the light-emitting element 120) in a plan view is rectangular. In this case, the light source 50 may be arranged in the through hole 10 so that one side of the rectangular shape thereof is parallel to one side of the rectangular shape of the light guide plate 110A, or may be arranged in the through hole 10 so that it is inclined relative to one side of the rectangular shape of the light guide plate 110A. For example, the light source 50 can be arranged in the through hole 10 so that the rectangular shape thereof is inclined by 45° relative to the rectangular shape of the light guide plate 110A in a plan view. With either arrangement, the center of the through hole of the light guide plate 110A generally coincides with the optical axis of the light source 50.

In the configuration illustrated in FIG. 2, the protruding portions 110d provided on the upper surface 110a of the light guide plate 110A each have a circular shape. The diameter of the circular shape is in the range of 1 µm or more and 500 µm or less, for example. It is understood that the shape of each protruding portion 110d in a plan view is not limited to a perfect circular shape. The shape of each of the protruding portions 110d in a plan view may be elliptical, distorted circular, polygonal, or indefinite. In the present specification, the shape of a protruding portion or a depressed portion in a plan view refers to the shape of the outer edge of the protruding portion or the depressed portion as projected onto a plane that is parallel to the upper surface of the light guide plate. If the shape of the protruding portion (or the depressed portion) in a plan view is other than a circular shape, the diameter of the virtual circle surrounding the outer edge of the protruding portion (or the opening of the depressed portion) is in the range shown above, for example.

As long as the protruding portion 110d has a shape that protrudes from the upper surface 110a of the light guide plate 110A, it is possible to realize the effect of increasing the light taken out of the upper surface 110a by suppressing total reflection inside the light guide plate 110A. Therefore, the protruding portion 110d can take various shapes such as a hemispherical shape, a conical shape, a pyramidal shape, a truncated pyramidal shape, and the like.

In the example shown in FIG. 2, the protruding portions 110d are arranged in the first region 111A in a two dimensional array such that their centers are located on the lattice points of a triangular lattice. Needless to say, the arrangement of the protruding portions 110d is not limited to this example, and any other arrangement may be adopted depending on the desired optical characteristics. For example, the protruding portions 110d may be arranged in the first region 111A in a two dimensional array such that their centers are located on the lattice points of a square lattice.

Figure 3:
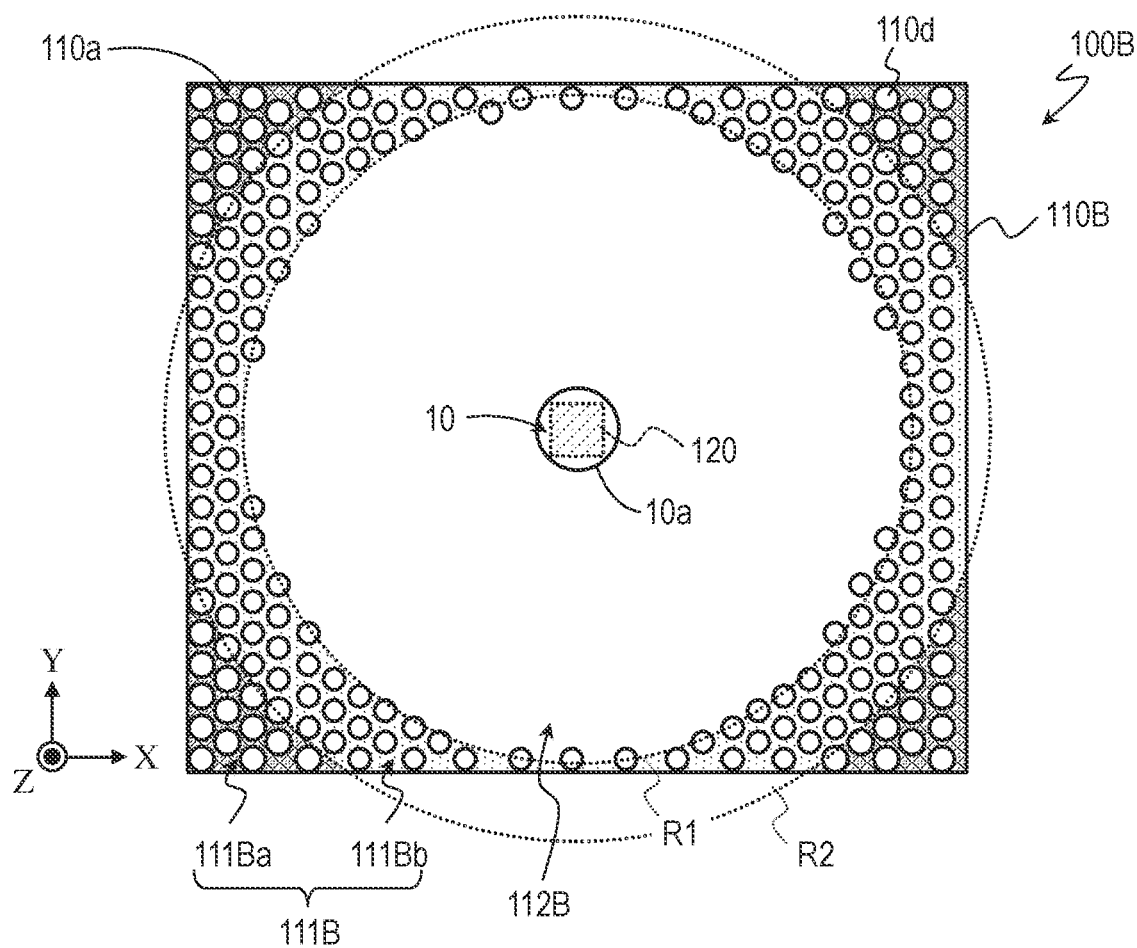
FIG. 3 is a schematic plan view showing another example of a light guide plate having a plurality of protruding portions on the upper surface.

FIG. 3 shows another example of a light guide plate having a plurality of protruding portions on the upper surface. The light-emitting region 100B shown in FIG. 3 includes, as a part thereof, a light guide plate 110B. The upper surface 110a of the light guide plate 110B includes a first region 111B and a second region 112B that is located inside the first region 111B. The second region 112B is a region of the upper surface 110a of the light guide plate 110B that surrounds the through hole 10, and the first region 111B is located outside the second region 112B and surrounds the second region 112B.

In the example shown in FIG. 3, the first region 111B is a region of the upper surface 110a that is outside the virtual circle R1, with a plurality of protruding portions 110d provided on the surface thereof. Similar to the example described above with reference to FIG. 2, the diameter of the circular shape of a protruding portion 110d located in a portion of the first region 111B that is outside the virtual circle R2 described above is larger than the diameter of the circular shape of a protruding portion 110d located inside the virtual circle R2. A region 111Ba of the first region 111B that is outside the virtual circle R2 may be referred to as the "outer region," and a region 111Bb of the first region 111B that is located closer to the light source 50 (here, the light-emitting element 120) than the outer region, or in other words, a region 111Bb that is sandwiched between the virtual circles R1 and R2 may be referred to as the "inner region." For the sake of simplicity, FIG. 3 shows the inner region 111Bb as a shaded area and an outer region 111Ba as a darkly shaded area.

On the other hand, the second region 112B is the region of the upper surface 110a that is sandwiched between the virtual circle R1 and the opening 10a of the through hole 10, and no protruding portion 110d is provided on the surface thereof. Therefore, in this example, the second region 112B is a ring-shaped region and the surface thereof is a flat surface. The outer shape of the second region 112B in a plan view is not limited to a circular shape as illustrated in FIG. 3, but may be any other shape such as an elliptical shape or a quadrilateral such as a rectangle shape or a diamond shape.

As illustrated in FIG. 3, the protruding portions 110d do not need to be formed across the entire upper surface 110a, as long as they are provided in at least a portion of the first region 111B. By providing a plurality of protruding portions 110d in the first region 111B, for example, the light to be extracted from the first region 111B is increased compared to the second region 112B. As a result, it is possible to increase the brightness of the first region 111B located farther away from the light source 50, and more effectively reduce the occurrence of brightness non-uniformity.

As illustrated in FIG. 3, the diameter of the circular shape of the protruding portions 110d is larger for those protruding portions 110d that are arranged farther away from the center of the light guide plate 110A than for those that are arranged closer to the center of the light guide plate 110A.

Thus, in the examples shown in FIGS. 2 and 3, the proportion of the area of the protruding portions 110d per unit area of the upper surface 110a of the light guide plate is increased among concentric parts of the first region in the direction away from the position of the light source 50. The phrase "among concentric parts of the first region" as used herein means that a center is shared by the plurality of shapes, and it is not limited to cases where the shapes sharing the center are perfect circles. The virtual circles R1 and/or R2 described above are not limited to perfect circles, but can be an ellipse, or the like. For example, when the upper surface 110a of the light guide plate 110B has a rectangular shape, the virtual circles R1 and R2 may each have an elliptical shape. In this case, the center of these elliptical shapes refers to the position where the major axis and the minor axis of the elliptical shape intersect.

Figure 4:
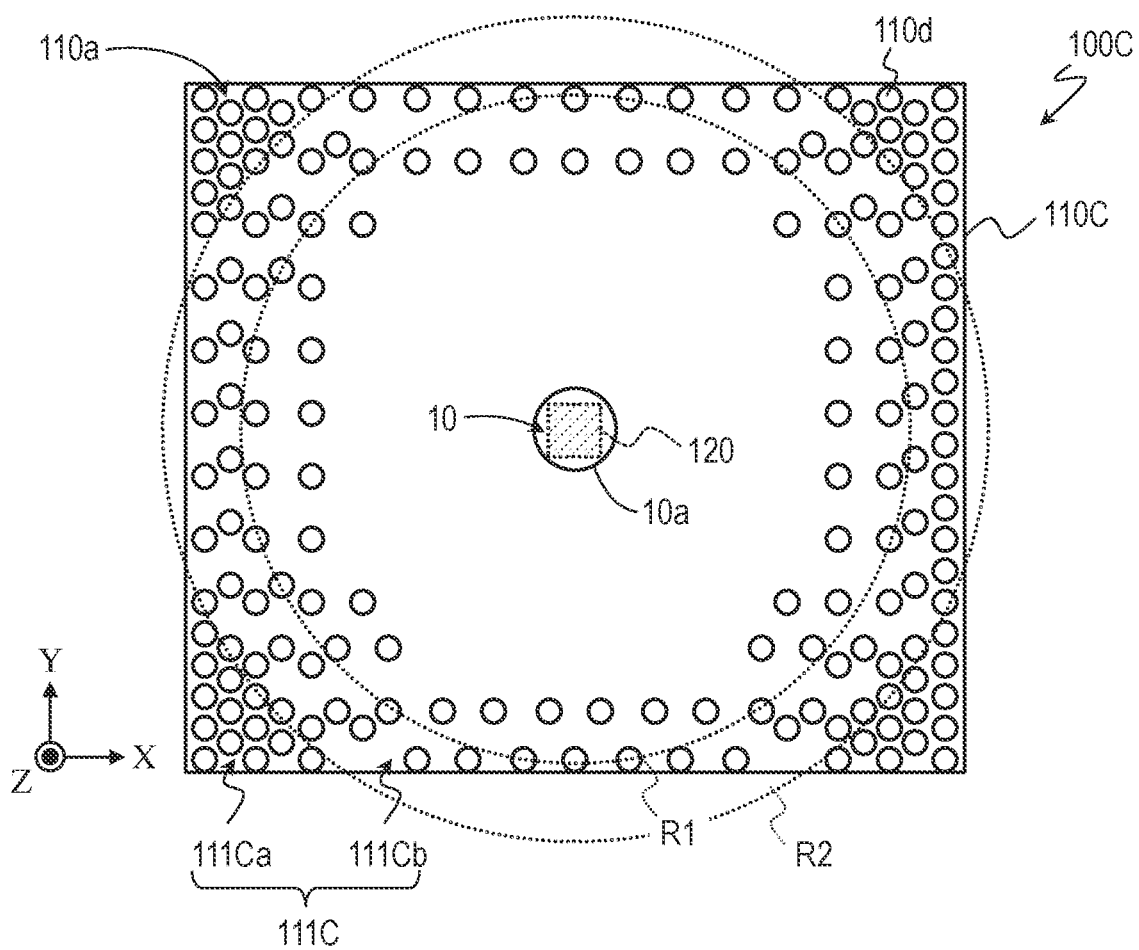
FIG. 4 is a schematic plan view showing yet another example of a light guide plate having a plurality of protruding portions on the upper surface.

FIG. 4 shows yet another example of a light guide plate having a plurality of protruding portions on the upper surface. A light guide plate 110C of a light-emitting region 100C shown in FIG. 4 has a first region 111C on the upper surface 110a thereof. The first region 111C includes an outer region 111Ca outside the virtual circle R2 and an inner region 111Cb sandwiched between the virtual circles R1 and R2.

In the configuration illustrated in FIG. 4, a plurality of protruding portions 110d are formed in the first region 111C of the upper surface 110a. In this example, the protruding portions 110d have an equal diameter, and the number density of the protruding portions 110d arranged in the inner region 111Cb of the first region 111C is higher than the number density of the protruding portions 110d arranged in a portion of the first region 111C inside the virtual circle R1. The number density of the protruding portions 110d arranged in the outer region 111Ca is higher than the number density of the protruding portions 110d arranged in the inner region 111Cb. In other words, the number density of the protruding portions 110d arranged in the first region 111C increases in the direction away from the light source 50.

The number density of protruding portions (or depressed portions) as used herein is defined as the number of protruding portions (or depressed portions) per unit area of the upper surface of the light guide plate. As illustrated in FIG. 4, by increasing the number density of the protruding portions 110d in the direction away from the light source 50, the proportion of the area of the protruding portions 110d per unit area can be increased among concentric parts of the first region in the direction away from the light source 50. Therefore, also with the configuration shown in FIG. 4, it is possible to increase the brightness of the area located farther away from the light source 50, and realize the effect of suppressing brightness non-uniformity.

In the example shown in FIG. 4, the protruding portions 110d are increasingly densely arranged in the direction away from the light-emitting element 120. That is, the protruding portions 110d may be arranged so that the arrangement pitch of the protruding portions 110d decreases in the direction away from the light source 50. The arrangement pitch of protruding portions (or depressed portions) as used herein is defined as the smallest center-to-center distance between two adjacent protruding portions (or depressed portions) for each region (e.g., for each of the outer region 111Ca and the inner region 111Cb). The arrangement pitch of the protruding portions 110d may be selected as appropriate depending on the size and shape of the protruding portions 110d and the desired optical characteristics, etc. The arrangement pitch of the protruding portions 110d is in the range of 10 µm or more and 200 µm or less, for example.

Note that in this example, the protruding portions 110d are also arranged in the region between the virtual circle R1 and the opening 10a of the through hole 10. However, the region between the virtual circle R1 and the opening 10a of the through hole 10 may be used as a second region in which no protruding portions 110d are arranged.

Figure 5:
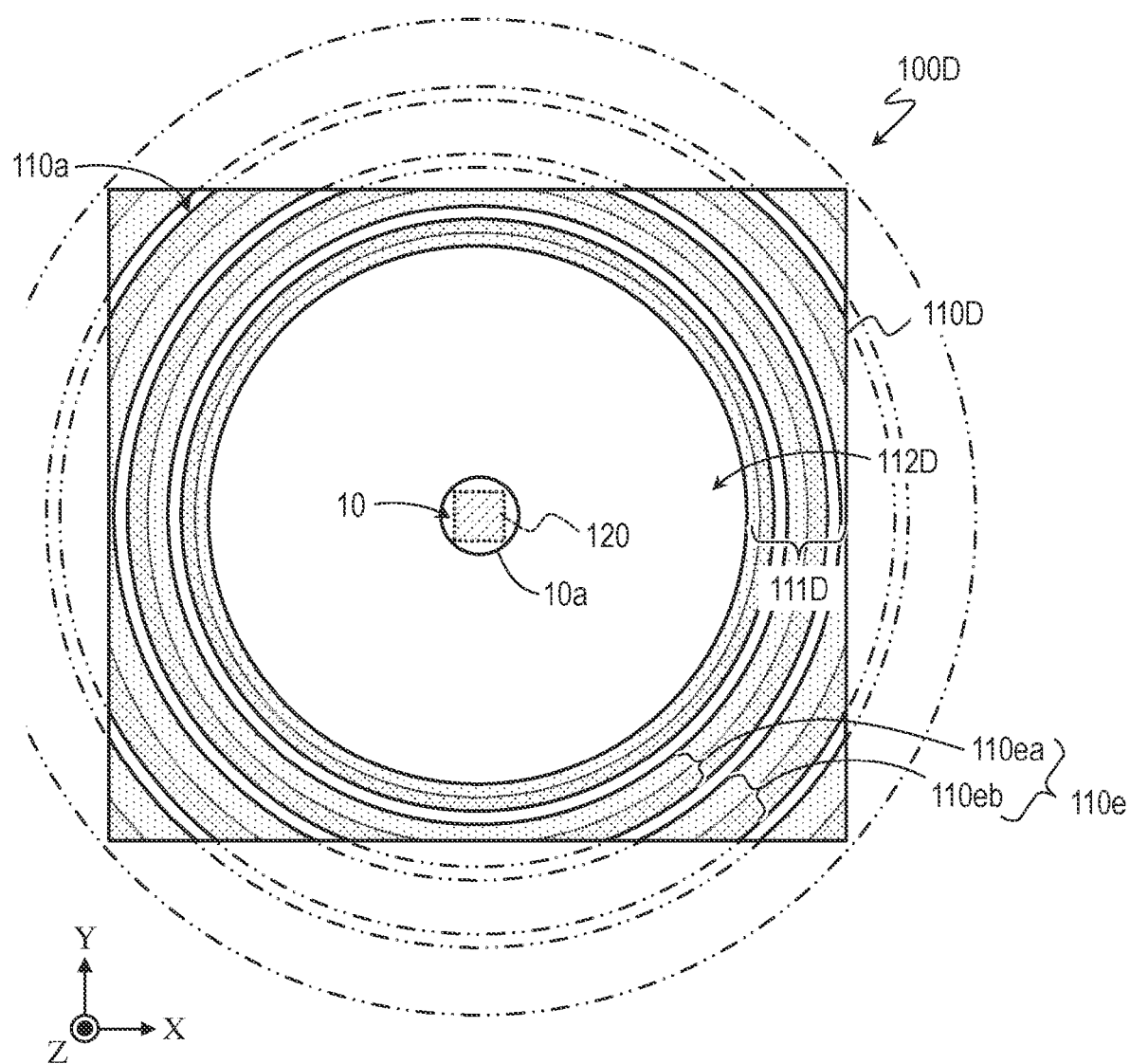
FIG. 5 is a schematic plan view showing another example of a plurality of protruding portions that can be provided in the first region of the light guide plate.

FIG. 5 shows yet another example of a light guide plate having a plurality of protruding portions on the upper surface. Compared to the light-emitting region 100A described above with reference to FIG. 2, a light-emitting region 100D shown in FIG. 5 includes a light guide plate 110D instead of the light guide plate 110A.

The upper surface 110a of the light guide plate 110D of the light-emitting region 100D shown in FIG. 5 has a first region 111D and a second region 112D that is inside the first region 111D, and a plurality of protruding portions 110e are provided in the first region 111D of the two regions. In this example, the protruding portions 110e are formed in the first region 111D of the upper surface 110a, and are each in the shape of a protruding ring having a circular ring shape. Portions of the first region 111D between the protruding rings may be flat surfaces. Note that in FIG. 5, for the sake of simplicity, each protruding portion 110e is drawn by shading. The cross section of the light guide plate 110D may be substantially the same as the cross section of the light guide plate 110A shown in the upper part of FIG. 2. Therefore, the cross section of the light-emitting region 100D is omitted here.

In the configuration illustrated in FIG. 5, the protruding portions 110e include a first protruding ring 110ea and a second protruding ring 110eb located outside the first protruding ring 110ea. The second protruding ring 110eb has a larger width than the first protruding ring 110ea. As shown in the example in FIG. 5, by increasing the width of the plurality of protruding rings in the direction away from the light-emitting element 120, for example, the proportion of the area of the protruding rings 110e per unit area in a plan view can be increased among concentric parts of the first region in the direction away from the light-emitting element 120 (which can be said to be the light source). Therefore, as in the case in which a plurality of protruding portions that have a circular shape in a plan view are arranged in the first region, it is possible to realize the effect of improving the brightness at positions in the first region away from the light source and suppressing brightness non-uniformity.

In FIG. 5, the second protruding ring 110eb is depicted with a part of the circular ring shape missing because the protruding rings are drawn to be larger by exaggeration for ease of discussion. As long as a shape can be regarded as a circular ring shape taking into account portions that are located outside the upper surface 110a of the light guide plate as indicated by a two-dot chain line in FIG. 5, such a shape can be considered included as a "circular ring shape" as used herein.

Instead of increasing the width of the protruding portion of the circular ring shape in the direction away from the light-emitting element 120, the spacing between the protruding portions may be decreased while keeping constant the width of the protruding portion of the circular ring shape. With such a configuration, the number density of protruding portions included per unit area can be increased, and it is therefore possible to increase the proportion of the area of the protruding portions 110e per unit area among concentric parts of the first region in a plan view. Alternatively, in addition to increasing the width of the protruding portions of the circular ring shape, the spacing between the protruding portions may be decreased.

A plurality of protruding portions each having a circular ring shape and a plurality of protruding portions each having a circular shape may coexist on the upper surface 110a. By arranging protruding portions of a circular shape in addition to protruding portions of a circular ring shape, it is possible to suppress the occurrence of a dark-bright pattern of a circular ring shape compared to the case in which only protruding portions of a circular ring shape are arranged.

Figure 6:
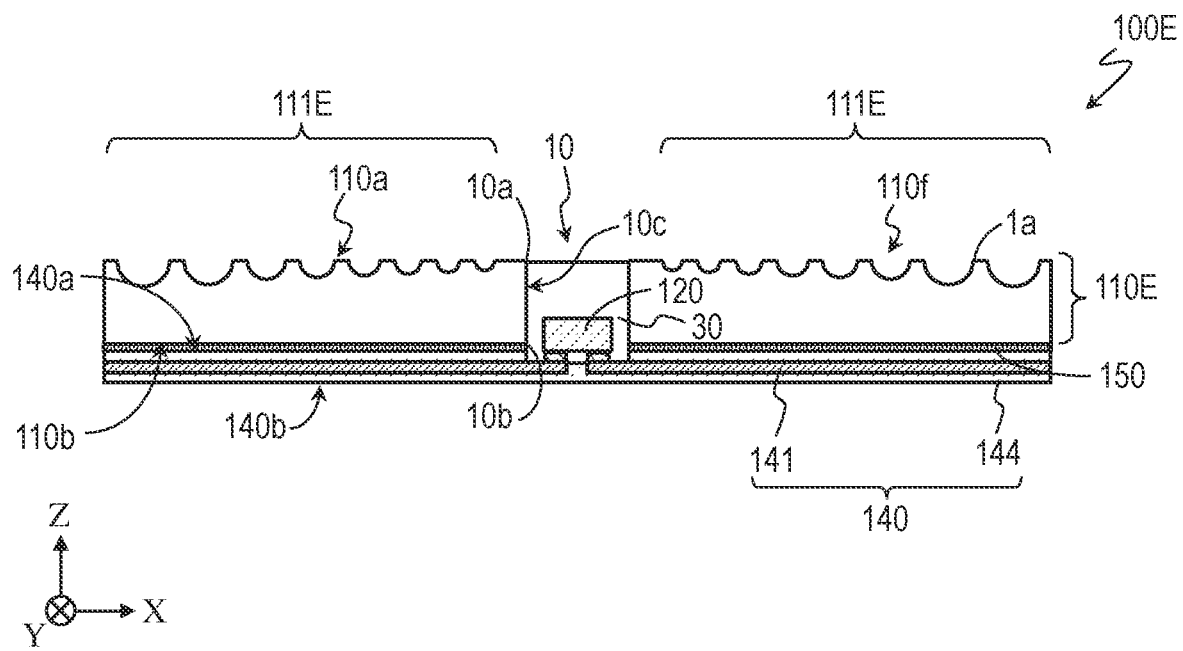
FIG. 6 is a schematic cross-sectional view showing another example of a structure that can be provided in the first region of the light guide plate.

FIG. 6 shows yet another example of a structure that can be provided in the first region of the light guide plate. Compared to the light-emitting region 100A described above with reference to FIG. 2, a light-emitting region 100E shown in FIG. 6 has a light guide plate 110E instead of the light guide plate 110A. A main difference between the light guide plate 110A and the light guide plate 110E is that a plurality of depressed portions 110f are formed, instead of a plurality of protruding portions 110d, in a first region 111E of the upper surface 110a of the light guide plate 110E. These depressed portions 110f are shaped so that the size of the openings 1a increases in the direction away from the light-emitting element 120, for example, as schematically shown in FIG. 6. Note that in FIG. 6, the depressed portions 110f are drawn to be larger by exaggeration for ease of discussion. In the configuration illustrated in FIG. 6, each of the depressed portions 110f is a structure that is depressed from the upper surface 110a toward the lower surface 110b of the light guide plate.

The depressed portions 110f may be of a shape that is obtained by inverting the shape of the protruding portions 110d described above with reference to FIGS. 2, 3 and 4 with respect to the upper surface 110a. The depressed portions 110f may each be a depression whose opening 1a is circular in a plan view, for example. In this example, as in the example shown in FIG. 2, the first region 111E accounts for substantially the entire portion of the upper surface 110a that does not overlap with the through hole 10, and the proportion of the area of the depressed portions 110f per unit area of the first region 111E increases among concentric parts of the first region in the direction away from the light source 50.

When a plurality of depressed portions 110f are arranged in the first region 111E as described above, as in the case in which a plurality of protruding portions 110d are arranged, it is possible to improve the brightness at the upper surface 110a in accordance with the proportion of the area of the depressed portions 110f per unit area. As in the example shown in FIG. 3, a second region in which no depressed portions 110f are arranged may be provided between the virtual circle R1 and the opening 10a of the through hole 10. An inner region and an outer region may be provided in the first region 111E, and the diameter of the depressed portions 110f located in the outer region may be larger than the diameter of the depressed portions 110f located in the inner region.

The number density of the depressed portions 110f may be increased in the direction away from the light-emitting element 120, as in the example shown in FIG. 4, instead of, or in addition to, increasing the size of the depressed portions 110f in the direction away from the light source 50 (e.g., the light-emitting element 120). The number density of the depressed portions 110f in the outer region may be larger than the number density of the depressed portions 110f in the inner region. Also with such a configuration, the proportion of the area of the depressed portions 110f per unit area can be increased among concentric parts of the first region in the direction away from the light source 50. Alternatively, the depressed portions 110f may be arranged increasingly more densely in the direction away from the light source 50. For example, the arrangement pitch of the depressed portions 110f may be decreased in the direction away from the light source 50.

The depressed portions 110f may be formed in the first region of the upper surface 110a, each as a groove of a circular ring shape. For example, by increasing the width of the ring-shaped grooves in the direction away from the light source 50, the proportion of the area of the depressed portions per unit area in a plan view may be increased among concentric parts of the first region in the direction away from the light source 50. Alternatively, the spacing between the depressed portions, each having a circular ring shape, can be decreased.

Figure 7:
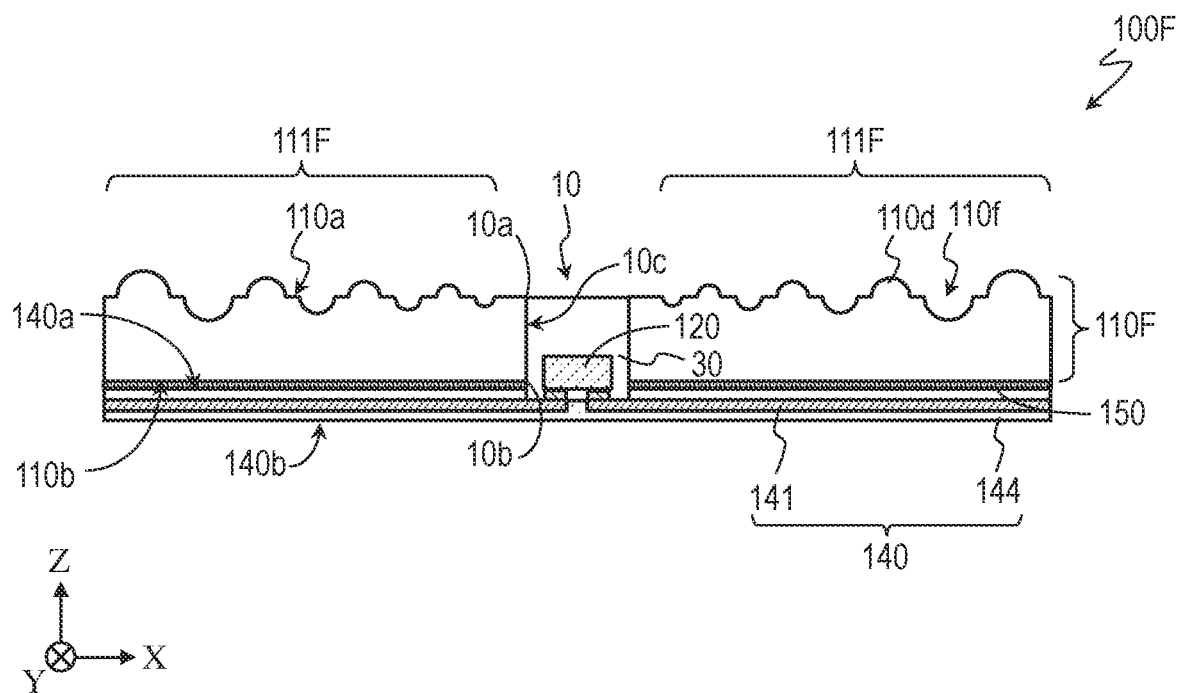
FIG. 7 is a schematic cross-sectional view showing yet another example of a structure that can be provided in the first region of the light guide plate.

FIG. 7 shows yet another example of a structure that can be provided in the first region of the light guide plate. The upper surface 110a of a light guide plate 110F of a light-emitting region 100F shown in FIG. 7 has a first region 111F. In this example, a plurality of protruding portions 110d and a plurality of depressed portions 110f are arranged in the first region 111F. Thus, a plurality of protruding portions and a plurality of depressed portions may coexist in the first region. The first region of the upper surface 110a of the light guide plate may have any combination of two or more selected from a plurality of protruding portions each having a circular shape, a plurality of depressed portions each having a circular shape, a plurality of protruding portions each having a circular ring shape, and a plurality of depressed portions each having a circular ring shape.

[Light-Emitting Element 120]

Figure 8:
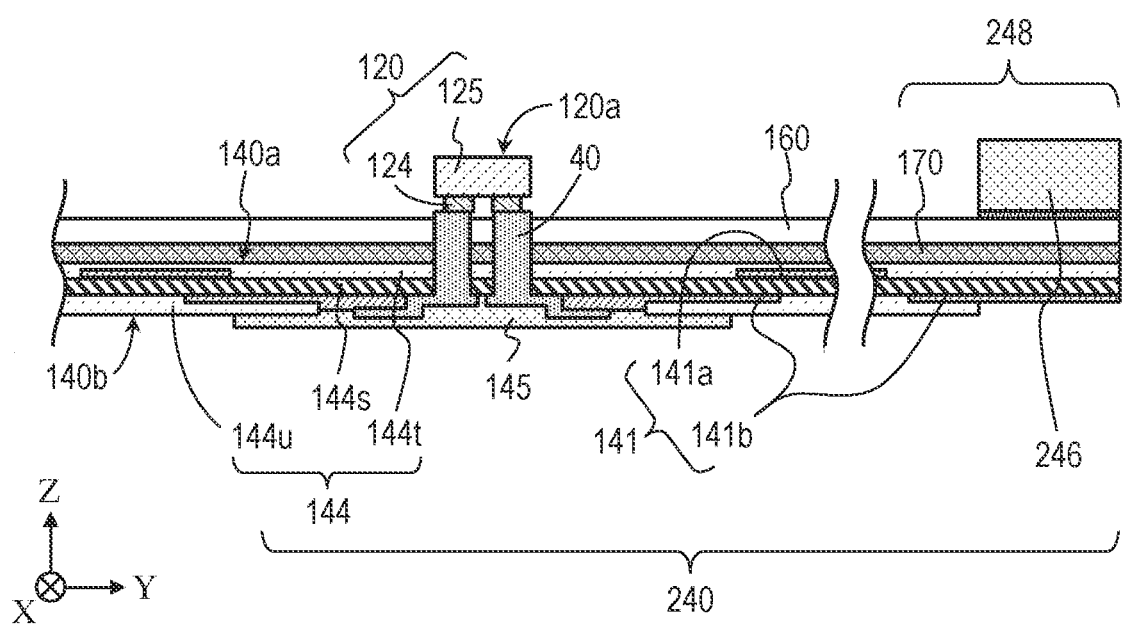
FIG. 8 is a schematic cross-sectional view showing, extracted, a light-emitting element and a wiring substrate in a light-emitting region shown in FIG. 2.

FIG. 8 shows a schematic cross section of the light-emitting element 120 and the wiring substrate 140 of the light-emitting region 100A shown in FIG. 2. Note that in the example shown in FIG. 8, a light-reflective sheet 160 is arranged on the upper surface 140a side of the wiring substrate 140. This light-reflective sheet 160 is secured to the wiring substrate 140 by an adhesive sheet 170 on the wiring substrate 140. With such a configuration, the light guide plate 110A is attached to the light-reflective sheet 160 by arranging the adhesive sheet 150 between the light guide plate 110A and the light-reflective sheet 160. Details of the light-reflective sheet 160 and the adhesive sheet 170 will be explained with reference to embodiments described below.

A typical example of the light-emitting element 120 is an LED. In the configuration illustrated in FIG. 8, the light-emitting element 120 has an element body 125 and an electrode 124. In the illustrated example, the electrode 124 is located on the opposite side of the light-emitting element 120 from an upper surface 120a.

The element body 125 includes a support substrate, such as sapphire or gallium nitride, and a semiconductor stack structure on the support substrate. The semiconductor stack structure includes an n-type semiconductor layer, a p-type semiconductor layer, and an active layer sandwiched therebetween. The semiconductor stack structure may include a nitride semiconductor ($In_xAl_yGa_{1-x-y}N$, $0 \leq x$, $0 \leq y$, $x+y \leq 1$) capable of emitting light in the ultraviolet to visible range. In this example, the upper surface 120a of the light-emitting element 120 coincides with the upper surface of the element body 125. The electrode 124 includes a pair of a positive electrode and a negative electrode. The electrode 124 has an electrical connection with the semiconductor stack structure, and has the function of supplying a predetermined current to the semiconductor stack structure.

The light source 50 of each light-emitting region 100 (e.g., light-emitting region 100A) in the surface light source 200 includes one or more light-emitting elements 120. The light-emitting element 120 in the light sources 50 may be an element that emits blue light or an element that emits light in wavelengths other than blue. The light-emitting element 120 has a semiconductor stack structure that includes at least one light-emitting layer. The semiconductor stack structure may include an n-type semiconductor layer, a p-type semiconductor layer, and a light-emitting layer capable of emitting one emission color. The light-emitting layer in the semiconductor stack structure is located between the n-type semiconductor layer and the p-type semiconductor layer. The light-emitting layer may have a structure with a single active layer, such as a double heterojunction or a single quantum well (SQW) structure, or may have a structure with a group of active layers, such as a multiple quantum well (MQW) structure.

The semiconductor stack structure can also include a plurality of light-emitting layers. For example, the semiconductor stack structure may have a structure including a plurality of light-emitting layers between an n-type semiconductor layer and a p-type semiconductor layer, or a structure that repeats an n-type semiconductor layer, a light-emitting layer and a p-type semiconductor layer in this order a plurality of times. The plurality of light-emitting layers may include active layers of different emission colors, or the emission colors may be the same among these light-emitting layers. Note that the term "same emission color" includes cases where the emission color can be considered the same in use, for example, where the emission colors vary by a few nanometers in the main wavelength. The combination of emission colors can be selected as appropriate. For example, when the semiconductor stack includes two active layers, the combination of emission colors from these active layers may be blue light and blue light, green light and green light, red light and red light, ultraviolet light and ultraviolet light, blue light and green light, blue light and red light, green light and red light, etc.

An LED that emits blue light will now be illustrated as the light-emitting element 120. The light-emitting element 120 in each light-emitting region 100A is secured to the wiring layer 141 of the wiring substrate 140 by a conductive paste. The light-emitting element 120 is electrically connected to the wiring layer 141 by a via 40 formed from the conductive paste.

The shape of the light-emitting element 120 in a plan view is typically a rectangular shape. The length of one side of the rectangular shape of the light-emitting element 120 is 1000 μm or less, for example. The vertical and horizontal dimensions of the rectangular shape of the light-emitting element 120 may be 500 μm or less. A light-emitting element whose vertical and horizontal dimensions are 500 μm or less is easily available at low cost. The vertical and horizontal dimensions of the rectangular shape of the light-emitting element 120 may be 200 μm or less. The length of one side of the rectangular shape of the light-emitting element 120 being small is advantageous for the expression of high-definition images, local dimming operation, etc., when used in a backlight unit of a liquid crystal display device, for example. Particularly, for a light-emitting element whose vertical and horizontal dimensions are both 250 μm or less, the area of the upper surface is smaller, and the amount of light emitted from the side surface of the light-emitting element is therefore relatively larger. Therefore, a batwing-shaped light distribution characteristic is likely to be obtained. A batwing-shaped light distribution characteristic as used herein generally refers to a light distribution characteristic as defined by a light intensity distribution such that the light intensity is high at an angle where the absolute value of the light distribution angle is greater than 0°, where the optical axis perpendicular to the upper surface of the light-emitting element is 0°.

As will be described below, a single light source 50 may include a plurality of light-emitting elements that emit light of different colors. For example, the light source 50 may include a light-emitting element that emits red light, a light-emitting element that emits blue light and a light-emitting element that emits green light. Alternatively, if the surface light source 200 includes a plurality of light-emitting regions 100, the plurality of light sources 50 provided in the surface light source 200 may include a mixture of light sources emitting red light, light sources emitting blue light and light sources emitting green light.

[Wiring Substrate 140 (Wiring Substrate 240)]

An example of the wiring substrate 240 is a flexible printed circuit board (FPC). The wiring substrate 240 may be a double-sided printed circuit board or a single-sided printed circuit board.

In the example shown in FIG. 8, the majority of the wiring layer 141 of the wiring substrate 140 is arranged in the insulating portion 144. In the configuration illustrated in FIG. 8, the wiring layer 141 includes a first wiring layer 141a located on the upper surface 140a side of the wiring substrate 140 and a second wiring layer 141b located on the lower surface 140b side of the wiring substrate 140. The first wiring layer 141a and the second wiring layer 141b are formed from a metal such as copper, and are electrically connected to each other by a via (not shown) inside the wiring layer 141.

In this example, a portion of the second wiring layer 141b is exposed from the insulating portion 144 at a terminal portion 248 located at the edge of the wiring substrate 240. The terminal portion 248 is a connector for connecting the surface light source 200 to a driver, or the like, and a portion of the second wiring layer 141b that is exposed from the insulating portion 144 at the terminal portion 248 functions as a relay terminal. In this example, the terminal portion 248 is reinforced by a plate-shaped support 246 formed from polyimide, or the like, attached to the upper surface 140a side of the wiring substrate 140.

In this example, the via 40 is formed running through the wiring substrate 140 from the upper surface 140a to the lower surface 140b, and electrically connects the electrode 124 of the light-emitting element 120 to the second wiring layer 141b of the wiring layer 141. That is, the via 40 and the wiring layer 141 (the first wiring layer 141a, the second wiring layer 141b, and a via (not shown) connecting therebetween) form an electrical path that connects together the light-emitting element 120 of each light-emitting region 100 and the relay terminal (a portion of the second wiring layer 141b) of the terminal part 248. This electrical path serves the function of supplying a predetermined current to the plurality of light sources 50 in the surface light source 200. The first wiring layer 141a and the second wiring layer 141b have wiring patterns such that it is possible to individually control the ON and OFF of these light sources 50, for example. In other words, the surface light source 200 according to the embodiment of the present disclosure can be configured to be capable of a so-called local dimming operation, i.e., individually driving the light sources 50. In this example, the portions of the vias that are exposed from the lower surface 140b of the wiring substrate 140 are covered by an insulating protection member 145 formed from a resin.

In the configuration illustrated in FIG. 8, the insulating portion 144 includes a sheet-shaped insulating base 144s that supports the first wiring layer 141a and the second wiring layer 141b, a first cover layer 144t that covers the first wiring layer 141a on the upper surface 140a side of the wiring substrate 140, a second cover layer 144u that covers the second wiring layer 141b on the lower surface 140b side of the wiring substrate 140, and the protection member 145 described above. An adhesive layer formed from a resin material such as epoxy, acrylic, olefin, etc., may be arranged between the first cover layer 144t and the insulating base 144s, and/or between the insulating base 144s and the second cover layer 144u.

The insulating base 144s of the insulating section 144 is formed from a resin such as polyimide (PI), polyethylene naphthalate (PEN), polyethylene terephthalate (PET), for example. For example, the material of the insulating base 144s may be FR4, which is specified in National Electrical Manufacturers Association (NEMA). As long as electrical insulation from the first wiring layer 141a and the second wiring layer 141b is ensured, it is possible to apply a metal substrate to the insulating base 144s. The first cover layer 144t and the second cover layer 144u are insulating layers formed from resin materials such as PI, PEN, PET, epoxy, etc., for example.

Figure 9:
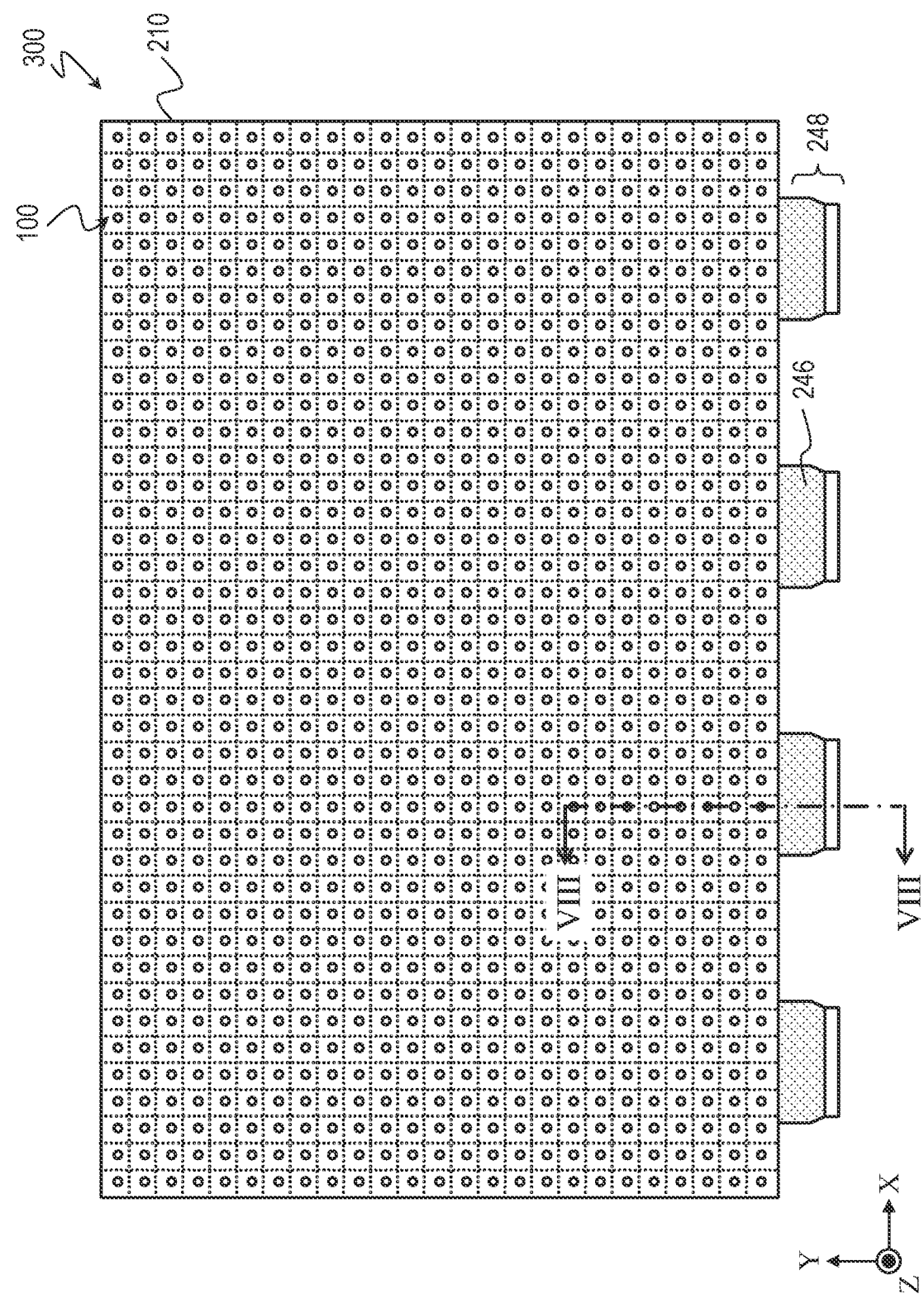
FIG. 9 is a schematic top view showing an example of a surface light source having a total of 1000 light-emitting regions.

FIG. 9 shows an example of a surface light source 300 having a total of 1000 light-emitting regions 100. In the configuration illustrated in FIG. 9, the light-emitting regions 100 are arranged in 25 rows and 40 columns. That is, in this example, the surface light source 300 includes a total of 1000 light sources 50 (e.g., 1000 LEDs) mounted as an array of 25 rows and 40 columns on the wiring substrate 240.

Here, a portion of the wiring substrate 240 is pulled outward from one side of the rectangular shape of the light guide plate 210 to form the terminal portion 248. FIG. 8, discussed above, corresponds to a portion of the cross section taken along line VIII-VIII in FIG. 9. As described above, on the reverse side of the terminal portion 248 shown in FIG. 9 (on the opposite side of the upper surface of the wiring substrate 240 where the light guide plate 210 is arranged), a portion of the second wiring layer 141b is exposed from the second cover layer 144u to form a relay terminal for the connection with a driver, etc.

It is understood that the number and arrangement of the light-emitting regions 100 in the surface light source 300 are not limited to this example and may be arbitrary. By changing the number and/or arrangement of the light-emitting regions 100 included in the surface light source 300, it is possible to easily apply the surface light source 300 to different types of liquid crystal display panels of different screen sizes. Moreover, a surface light source device having a larger light-emitting surface can be obtained by two-dimensionally or one-dimensionally arranging surface light sources 300 each having a plurality of light sources 50, as illustrated in FIG. 9. For example, the surface light source 300 can be suitably used for a backlight unit of a mobile device, and the surface light source device including a plurality of surface light sources 300 can be used for a backlight unit of an liquid crystal display TV, etc. Thus, according to the embodiment of the present disclosure, it is relatively easy to obtain a light-emitting surface having a large area.

By changing the number of surface light sources (surface light sources 300 or surface light sources 200) included in the surface light source device, or by changing the arrangement of the surface light sources, it is also easy to apply the surface light source device to different types of liquid crystal display panels of different screen sizes. That is, it is possible to flexibly accommodate changes in screen size without the need to redo optical calculations related to the surface shape, etc., of the light guide plate 210 in the surface light source. Therefore, it is possible to suppress the increase in manufacturing cost and lead time for changes in screen size.

In a two-dimensional or one-dimensional array of a plurality of surface light sources in a surface light source device, the light guide plates 210 may be in direct contact with each other or spaced apart from each other between two surface light sources adjacent in the row or column direction. If the light guide plates 210 are spaced apart from each other, a light guide structure for optically coupling together two light guide plates 210 adjacent to each other may possibly be interposed therebetween. Such a light guide structure can be formed, for example, by applying a light-transmissive adhesive to the side surface of the light guide plates 210 and then curing the applied adhesive. Alternatively, a light guide structure may be formed by one-dimensionally or two-dimensionally arranging a plurality of surface light sources spaced apart from each other, and filling the area between two light guide plates 210 adjacent to each other with a light-transmissive resin material, which is then cured. The material of the light guide structure located between light guide plates 210 may be similar to the material of the first light-transmissive member 30 described below, for example.

[First Light-Transmissive Member 30]

Reference is again made to FIG. 2. The first light-transmissive member 30 is located in the through hole 10 of the light guide plate 110A and covers the light source 50. A resin material including a transparent resin as a base material can be used as the material of the first light-transmissive member 30. A typical example of the base material of the first light-transmissive member 30 is a thermosetting resin such as an epoxy resin, a silicone resin, or the like. The base material of the first light-transmissive member 30 may be an epoxy resin, a silicone resin, a modified silicone resin, a phenolic resin, a polycarbonate resin, an acrylic resin, a polymethylpentene resin, a polynorbornene resin, a polyethylene terephthalate or polyester, or a material containing two or more of these materials.

The first light-transmissive member 30 has a transmittance of 60% or more, for example, for light having a peak emission wavelength of the light-emitting element 120. For effective use of light, the transmittance of the first light-transmissive member 30 at the peak emission wavelength of the light-emitting element 120 is preferably 70% or more, and more preferably 80% or more. For efficiently introducing light from the light source 50 into the light guide plate 110A, it is advantageous if the first light-transmissive member 30 has a refractive index equivalent to or higher than that of the material of the light guide plate 110A.

An upper surface 30a of the first light-transmissive member 30 is a surface of the first light-transmissive member 30 that is located on the side of the upper surface 110a of the light guide plate 110A, and in the example shown in FIG. 2, it is a flat surface that generally coincides with a flat portion of the upper surface 110a of the light guide plate 110A. Note however that it is not necessary in the embodiment of the present disclosure that the upper surface 30a of the first light-transmissive member 30 is a flat surface and that it coincides with the upper surface 110a of the light guide plate 110A. The upper surface 30a of the first light-transmissive member 30 may be raised relative to the upper surface 110a of the light guide plate 110A, or depressed from the position of the upper surface 110a of the light guide plate 110A.

As will be described below, the first light-transmissive member 30 may have a stacked structure including a plurality of members stacked together. In that case, a material having a refractive index different from that of the base material, for example, may be used in some or all of the plurality of members of the stacked structure. This can provide a light-diffusing function to the first light-transmissive member 30. A phosphor may be dispersed in some or all of the plurality of members of the stacked structure.

[Adhesive Sheet 150]

The adhesive sheet 150 may be a resin sheet known in the art having an adhesive layer. For example, the adhesive sheet 150 may be a sheet-form optical transparent adhesive (OCA).

The adhesive sheet 150 may be light-reflective, for example, with a light-reflective filler being dispersed therein. As the adhesive sheet 150 is light-reflective, light that is introduced from the light source 50 into the light guide plate 110A and directed toward the lower surface 110b of the light guide plate 110A can be reflected by the adhesive sheet 150 toward the upper surface 110a of the light guide plate 110A, thus improving the light utilization efficiency. The terms "reflective" and "light-reflective" as used herein mean that the reflectance is 60% or more at the peak emission wavelength of the light-emitting element 120. The reflectance of the adhesive sheet 150 at the peak emission wavelength of the light-emitting element 120 is more preferably 70% or more, and even more preferably 80% or more.

Second Embodiment

Figure 10:
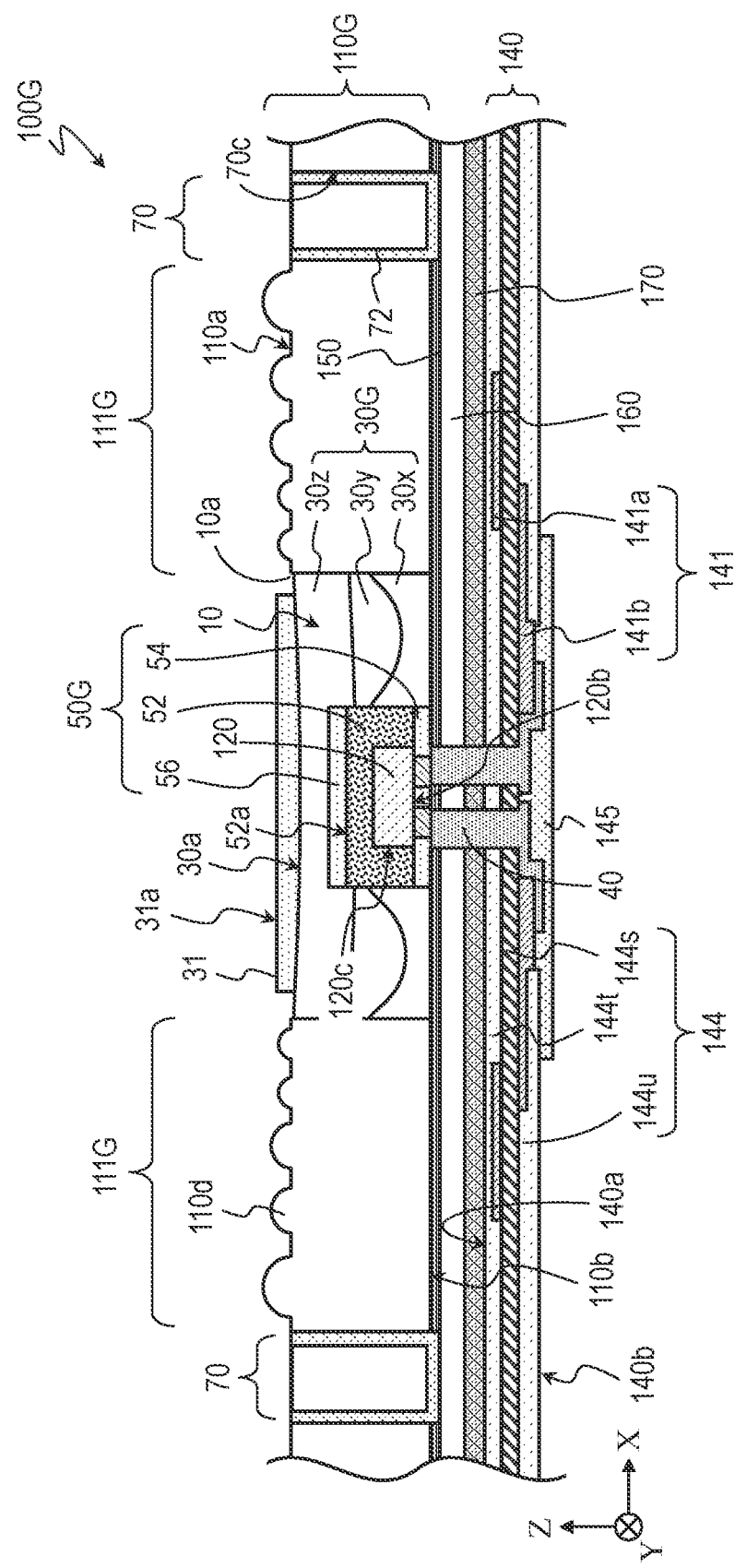
FIG. 10 is a schematic cross-sectional view showing an illustrative configuration of a light-emitting region of a surface light source according to another embodiment of the present disclosure.

FIG. 10 shows an illustrative configuration of a light-emitting region of a surface light source according to another embodiment of the present disclosure. A light-emitting region 100G shown in FIG. 10 is also an example of the light-emitting region 100, which is a unit forming the surface light source 200 shown in FIG. 1. Compared to the light-emitting region 100A described above with reference to FIG. 2, the light-emitting region 100G shown in FIG. 10 has a light guide plate 110G instead of the light guide plate 110A and has a light source 50G instead of the light source 50. As in the light guide plate 110A, the light guide plate 110G also has the through hole 10, and the light source 50G supported by the wiring substrate 140 is located inside the through hole 10.

[First Light-Reflective Member 31]

In the configuration illustrated in FIG. 10, the light-emitting region 100G has a first light-reflective member 31 that covers the upper surface 30a of the first light-transmissive member 30G arranged inside the through hole 10. The first light-reflective member 31 is a white resin layer formed from a resin material including a light-reflective filler dispersed in a base material, for example.

By arranging the first light-reflective member 31 above the light-emitting element 120, at least a portion of the light emitted upward from the light-emitting element 120 can be reflected by the first light-reflective member 31. Therefore, it is possible to prevent the brightness in an area of the light-emitting surface of the light-emitting region 100G that is located directly above the light-emitting element 120 from being significantly higher than in an area that is located away from the light-emitting element 120. Thus, the first light-reflective member 31 contributes to suppressing brightness non-uniformity of the light-emitting surface of the light-emitting region 100G, and by arranging the first light-reflective member 31 on at least a portion of the upper surface 30a of the first light-transmissive member 30G, it is possible to more advantageously reduce the thickness of the light-emitting region 100G as a whole. The first light-reflective member 31 has a thickness in a range of about 0.02 mm or more and 0.05 mm or less, for example.

By reflecting at least a portion of the light emitted upward from the light-emitting element 120 by the first light-reflective member 31, it is possible to efficiently diffuse the light emitted from the light-emitting element 120 across the plane of the light guide plate 110G. In this sense, it is advantageous if the upper surface 30a of the first light-transmissive member 30G has a shape (e.g., an inverted cone shape or an inverted polygonal pyramidal shape) that is depressed toward the wiring substrate 140 as shown in FIG. 10. In the configuration illustrated in FIG. 10, the upper surface 31a of the first light-reflective member 31 is a generally flat surface. However, there is no limitation to this example, and the first light-reflective member 31 may have a shape that conforms to the shape of the upper surface 30a of the first light-transmissive member 30G.

Examples of base materials for forming the first light-reflective member 31 are a silicone resin, a phenolic resin, an epoxy resin, a BT resin, polyphthalamide (PPA), and the like. The light-reflective filler may be particles of a metal or particles of an inorganic or organic material having a higher refractive index than the base material. Examples of the light-reflective filler include particles of titanium dioxide, silicon dioxide, zirconium dioxide, potassium titanate, aluminum oxide, magnesium oxide, aluminum nitride, boron nitride, mullite, niobium oxide, barium sulfate, or particles of various rare earth oxides such as yttrium oxide and gadolinium oxide.

The first light-reflective member 31 may be selectively formed on a portion of the light-emitting surface of the light-emitting region 100G, i.e., on the upper surface 30a of the first light-transmissive member 30G, or a portion thereof may be located on the upper surface 110a of the light guide plate 110G. The shape of the first light-reflective member 31 in a plan view is typically similar to the shape of the opening 10a of the through hole 10. For example, if the opening 10a of the through hole 10 has a circular shape, the shape of the first light-reflective member 31 in a plan view may be a circular shape having a diameter smaller than the diameter of the circular shape of the opening 10a. When the opening 10a of the through hole 10 has a rectangular shape, the shape of the first light-reflective member 31 in a plan view may be a rectangular shape that covers the rectangular shape of the opening 10a.

[First Light-Transmissive Member 30G]

In the example shown in FIG. 10, the first light-transmissive member 30G has a stacked structure including a first layer 30x, a second layer 30y and a third layer 30z. The first layer 30x, the second layer 30y and the third layer 30z are stacked in this order inside the through hole 10 from the lower surface 110b side to the upper surface 110a side of the light guide plate 110G. Thus, the first light-transmissive member 30G may have a stacked structure. Note that in this example, among the first layer 30x, the second layer 30y and the third layer 30z, the upper surface of the first layer 30x, which is located closest to the wiring substrate 140, has a depressed surface that is depressed toward the wiring substrate 140. The depressed surface of the first layer 30x can be formed so as to surround the light source 50G in a plan view. The upper surface of the second layer 30y may include such a depressed surface.

When the first light-transmissive member in the through hole 10 has a stacked structure, as in this example, the plurality of members of the stacked structure may be of the same material or different materials. For example, a material having a refractive index different from that of the base material may be dispersed in one or more of the first layer 30x, the second layer 30y and the third layer 30z. Alternatively, a phosphor may be dispersed in any one or more of these layers. By forming the first light-transmissive member in the through hole 10 from a plurality of materials, it is possible to adjust the light distribution, spectrum, etc., of light extracted from different light-emitting regions.

[Light Guide Plate 110G]

Similar to the light guide plate 110A described above, the light guide plate 110G of the light-emitting region 100G also has a first region 111G in which a plurality of protruding portions or depressed portions are formed in at least a portion of the upper surface 110a. Here, an example is shown in which a plurality of protruding portions 110d having a circular shape are arranged in the first region 111G of the upper surface 110a of the light guide plate 110G. It is understood that the structure provided in the first region 111G is not limited to the plurality of protruding portions 110d having a circular shape. The first region 111G may have any one or more selected from a plurality of protruding portions each having a circular shape, a plurality of depressed portions each having a circular shape, a plurality of protruding portions each having a circular ring shape, and a plurality of depressed portions each having a circular ring shape.

The light guide plate 110G further has one or more first grooves 70 formed so as to surround the light source 50G in a plan view. The provision of the first grooves 70 in the light guide plate 110G may advantageously improve the contrast ratio between two light-emitting regions 100G adjacent to each other under local dimming drive, for example. As shown in FIG. 10, in this example, each first groove 70 includes an opening located in the upper surface 110a of the light guide plate 110G, and reaches to the lower surface 110b of the light guide plate 110G. Note however that, as will be later described in detail with reference to the drawings, in the embodiment of the present disclosure, the first grooves 70 do not need to be shaped running through the light guide plate 110G from the upper surface 110a to the lower surface 110b as viewed in cross-sectional view.

Figure 11:
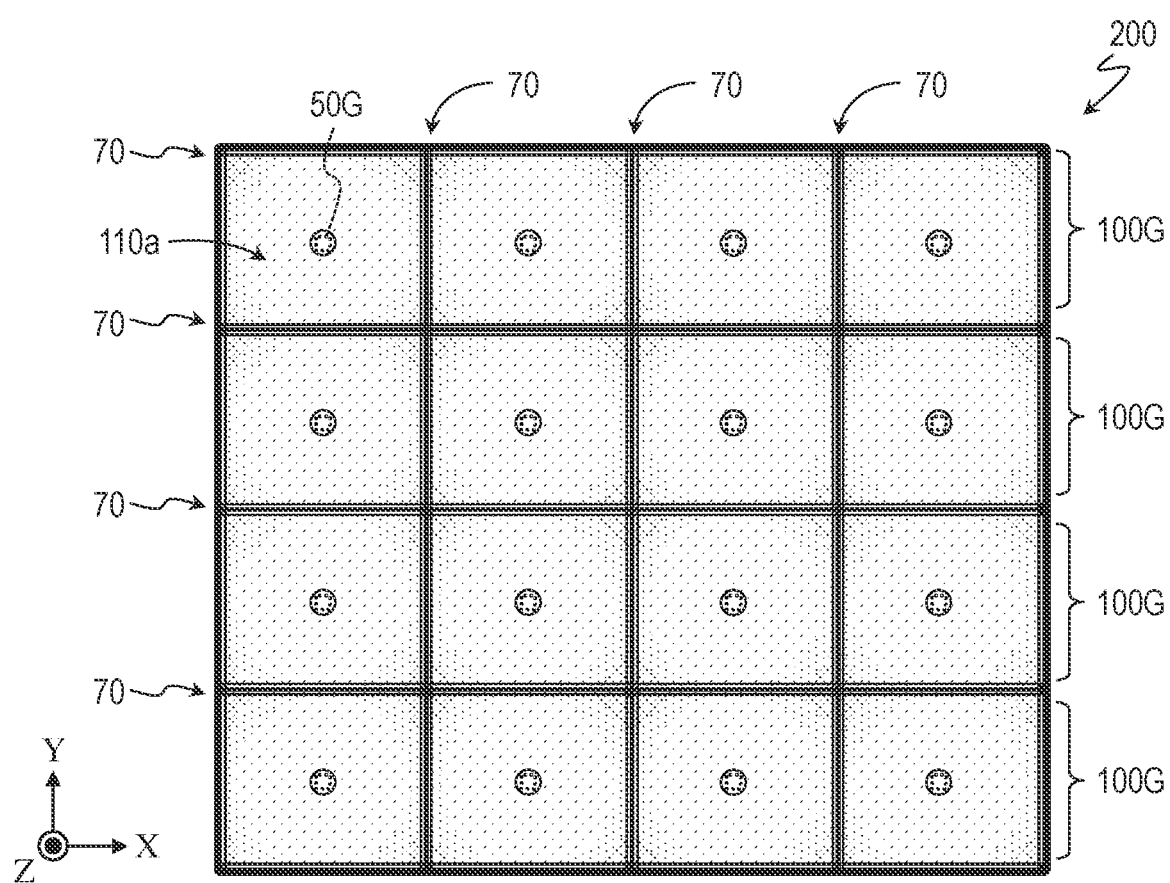
FIG. 11 is a schematic plan view illustrating an example of an arrangement of first grooves in the light guide plate of the surface light source.

FIG. 11 shows an example of the arrangement of the first grooves 70 in the light guide plate 210 of the surface light source 200. In the configuration illustrated in FIG. 11, each of the plurality of first grooves 70 extends linearly in the X direction or the Y direction between two adjacent light-emitting regions 100G arranged in a two-dimensional array or along an outer edge of the light guide plate 210. That is, in this example, the first grooves 70 include a plurality of grooves located at the boundaries between two adjacent light-emitting regions 100G, and the collection of the first grooves 70 forms a lattice-shaped groove structure provided on the light guide plate 210 of the surface light source 200. Note that the first grooves 70 located along the outer edges of the light guide plate 210 may be omitted. The width of each first groove 70 as viewed in top view is about 220 μm, for example.

Figure 12:
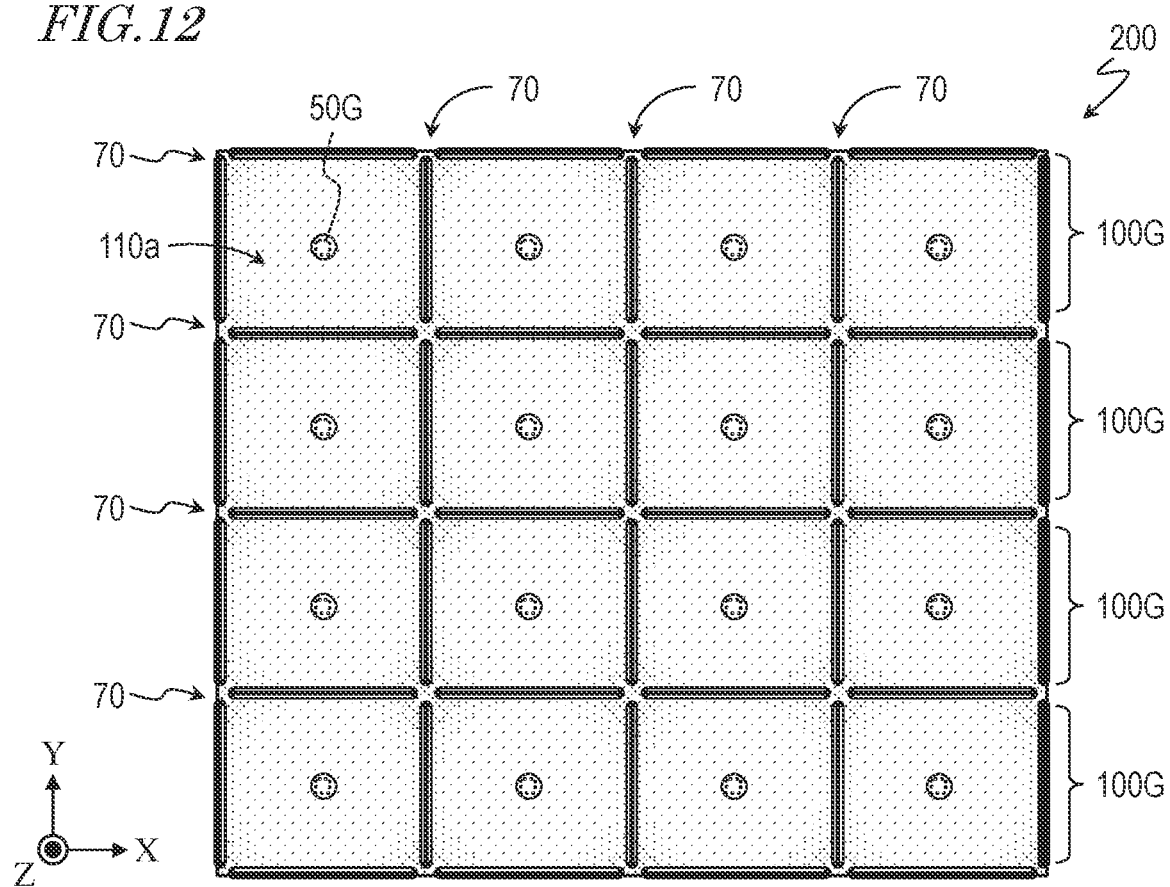
FIG. 12 is a schematic plan view illustrating another example of an arrangement of first grooves in the light guide plate of the surface light source.

FIG. 12 shows another example of the arrangement of the first grooves 70 in the light guide plate 210. In the example shown in FIG. 12, a plurality of first grooves 70, each of which is linear, are formed in the light guide plate 210. More specifically, in the configuration illustrated in FIG. 12, for one light-emitting region 100G, from among the light-emitting regions 100G arranged in a two-dimensional array, excluding those that are located along the outermost periphery, four first grooves 70 are arranged so as to surround the light source 50G in that light-emitting region 100G. In other words, as the surface light source 200 is viewed from the direction normal to the upper surface 210a of the light guide plate 210, the area inside one or more first grooves 70 provided so as to surround the light source 50G can be considered defining the light-emitting region in the surface light source 200.

Thus, the first grooves 70 only need to be provided so as to surround the light source 50G included in the light-emitting region 100G, and it is not necessary that each first groove 70 has a structure that continuously extends in a straight line from one end to the other end of the light guide plate 210 along the X direction or the Y direction. In other words, it is not necessary that the one or more first grooves 70 provided in the light guide plate 210 form a continuous shape (e.g., a rectangular shape) that surrounds the light-emitting element 120 in each light-emitting region 100G. Note that for light-emitting regions 100G that are located along the outermost periphery in the two-dimensional array of the light-emitting regions 100G, the first grooves 70 may not surround the light-emitting element 120 on all sides in a plan view.

In the configuration illustrated in FIG. 10, the first groove 70 has a rectangular cross-sectional shape. In other words, an inner surface 70c defining the shape of the first groove 70 is perpendicular to the upper surface 110a of the light guide plate 110G as viewed in cross-sectional view. However, there is no limitation to this example, and the inner surface 70c of the first groove 70 may be inclined relative to a plane perpendicular to the upper surface 110a of the light guide plate 110G as viewed in cross-sectional view. For example, the cross-sectional shape of the first groove 70 may be a trapezoidal shape. In the example shown in FIG. 10, the first groove 70 has a shape running through the light guide plate 110G from the upper surface 110a to the lower surface 110b. However, as will be described below, the shape of each first groove 70 as viewed in cross-sectional view is not limited to a shape that has an opening both on the upper surface 110a and on the lower surface 110b of the light guide plate.

[Partition Member 72]

In the example shown in FIG. 10, a light-reflective partition member 72 is located inside the first groove 70. The partition member 72 is light-reflective by being formed from a resin material including a light-reflective filler dispersed therein in the resin as a base material, for example. The material of the partition member 72 may be the same material as the first light-reflective member 31. The partition member 72 may be a white member.

By arranging the partition member 72 on the inside of the first groove 70, it is possible to more advantageously improve the contrast ratio between two adjacent light-emitting regions 100G. The partition member 72 may be arranged on the inside of all the first grooves 70 or may be selectively arranged on the inside of some first grooves 70.

Note that in this example, the partition member 72 is arranged on the inside of the first groove 70 as a thin film covering the inner surface 70c of the first groove 70. That is, the partition member 72 is herein provided as a light-reflective layer on the inner surface 70c that defines the shape of the first groove 70. When the partition member 72 is provided as a thin film on the inner surface 70c of the first groove 70, the thickness of the partition member 72 does not need to be constant in the depth direction of the first groove 70. The partition member 72 may be formed thinner near the upper surface 110a of the light guide plate 110G and thicker near the lower surface 110b of the light guide plate 110G.

The partition member 72 may be arranged in the first groove 70 and on the surface of the light guide plate 110G.

The partition member 72 may be arranged on the inside of the first groove 70. In this case, the upper surface of the partition member 72 may be a flat surface that generally coincides with the upper surface 110a of the light guide plate 110G, or may have a shape that is depressed with respect to the upper surface 110a or raised from the upper surface 110a. The partition member 72 may be formed so as to entirely fill the inside of the first groove 70, or may be formed so as to fill a portion of the inside of the first groove 70. For example, the partition member 72 may be arranged to fill about a half of the first groove 70 in the depth direction of the first groove 70.

It is not necessary that the light-reflective filler is uniformly distributed in the partition member 72, and the distribution of the light-reflective filler may be lopsided. For example, the concentration of the light-reflective filler in a portion located at the bottom of the first groove 70 may be higher than that near the opening of the first groove 70.

The material used to form the partition member 72 is not limited to a resin-based material. The partition member 72 may be a reflective film, such as a metallic film or a dielectric multilayer film. For example, the partition member 72 may be arranged on the inside of the first groove 70 in the form of an Ag film, an Al film, or the like. Also in this case, a portion of the partition member 72 may still be located on the upper surface 110a and/or the lower surface 110b of the light guide plate.

Another example of the first groove 70 is a V-shaped groove having an opening on the upper surface 110a of the light guide plate 110G. The shape of the first groove 70 may also be a shape first that does not have an opening on the upper surface 110a of the light guide plate but has an opening on the lower surface 110b. Thus, it is not necessary that the first groove 70 has an opening both on the upper surface 110a and the lower surface 110b of the light guide plate, or in other words, that the first groove 70 is shaped so as to extend from the upper surface 110a to reach the lower surface 110b of the light guide plate. Note that in the case in which the light guide plate 110G is formed by stacking a plurality of light-transmissive layers, the partition member 72 can be formed embedded inside the light guide plate 110G.

The portion of the inside of the first groove 70, excluding the partition member 72, may be filled with air. Note however that a portion of the inside of the first groove excluding the partition member 72 may be filled with, instead of air, a material having a refractive index smaller than that of the material of the light guide plate 110G.

The first groove 70 is not limited to a V-shaped groove, and various shapes can be employed as the shape of the first groove 70. For example, the first groove 70 may be a U-shaped groove. Various shapes of the first groove 70 can be obtained by selecting a tool for obtaining the shape of the light guide plate 210, such as a grinding wheel (blade) or a mold. Thus, the shape of one or more inner surfaces 70c that define the shape of the first groove 70 is not limited to a flat surface shape, but may be a shape with a curved surface. The shape of the side surface of the first groove 70 as viewed in cross-sectional view is not limited to a straight line shape or an arc shape, or a combination thereof, but may be a shape that includes steps or bends.

It is not necessary that the width of the first groove 70 is narrowed from the upper surface 110a toward the lower surface 110b of the light guide plate 110G. The first groove 70 may also have a shape such that the width of the opening of the first groove 70 first decreases and then increases from the upper surface 110a toward the lower surface 110b of the light guide plate 110G. Conversely, when the first groove 70 has an opening on the lower surface 110b of the light guide plate 110G, the first groove 70 may have a shape such that the width of the opening of the first groove 70 first decreases and then increases from the lower surface 110b toward the upper surface 110a of the light guide plate 110G.

The depth of the first groove 70 is, for example, in the range of 20% or more and 100% or less of the thickness of the light guide plate, for example. Note that in the example shown in FIG. 10, the first groove 70 runs through the adhesive sheet 150 to reach the light-reflective sheet 160. In this sense, the first groove 70 can be said to have a depth greater than the thickness of the light guide plate. In order to improve the contrast ratio between two light-emitting regions 100G adjacent to each other, it is advantageous that the first groove 70 is shaped so as to run through the light guide plate. In this case, the light guide plate 210 of the surface light source 200 can be said to include a plurality of spatially separated portions for each unit that includes a light source (e.g., the light guide plate 110G). On the other hand, when the first groove 70 is provided in the light guide plate so as not to run through the light guide plate, a surface light source having an excellent mechanical strength is easily realized.

[Light-Reflective Sheet 160]

In the configuration illustrated in FIG. 10, the surface light source further includes the light-reflective sheet 160. In this example, the light-reflective sheet 160 is located between the adhesive sheet 150 described above and the adhesive sheet 170 described below, which is located on the wiring substrate 140.

The light-reflective sheet 160 is a white material, for example, and the light utilization efficiency is improved as light traveling toward the wiring substrate 140 side inside the light guide plate 110G is reflected toward the upper surface 110a of the light guide plate. The material of the light-reflective sheet 160 may be a resin material including a resin and a light-reflective filler dispersed in the resin, similar to the material of the first light-reflective member 31 described above. The light-reflective sheet 160 may be, for example, a resin sheet including polyethylene terephthalate as a base material. The light-diffusing material dispersed in the light-reflective sheet 160 may be particles of titanium oxide, for example. As an alternative to dispersing the light-diffusing material in the base material, a sheet of white polyethylene terephthalate containing a large number of air bubbles may be used as the light-reflective sheet 160.

The light-reflective sheet 160 has a thickness in the range of 35 μm or more and 350 μm or less, typically in the range of 50 μm or more and 100 μm or less, for example. A resin sheet manufactured by Toray Industries, Inc., commercially available under the name Lumirror® (#38-E20, #50-E20, #75-E20, #100-E20, #188-E6SR, etc.) may be used for the light-reflective sheet 160.

[Adhesive Sheet 170]

The adhesive sheet 170 is arranged between the wiring substrate 140 and the light-reflective sheet 160, and secures the light-reflective sheet 160 to the upper surface 140a of the wiring substrate 140. The adhesive sheet 170 may be an adhesive layer formed from a resin material such as acrylic, for example. A resin sheet known in the art having an adhesive layer, such as a bonding sheet, may be used as the adhesive sheet 170. As with the adhesive sheet 150 described above, the adhesive sheet 170 may be light-reflective.

[Light Source 50G]

The configuration of the light source 50G shown in FIG. 10 will now be described in detail. For example, in the example shown in FIG. 10, the light source 50G includes a second light-transmissive member 52, a cover member 54 and a second light-reflective member 56, in addition to the light-emitting element 120.

The shape of the light source 50G in a plan view is typically rectangular. The length of one side of the upper surface of the light source 50G may be about 850 µm. Inside the through hole 10, the light source 50G may be arranged so that one side of the rectangular shape of the upper surface thereof is generally parallel to one side of the rectangular shape of the light guide plate 110G. The light source 50G may be arranged in a through hole 10G so that one side of the rectangular shape of the upper surface thereof is generally parallel to the diagonal of the rectangular shape of the light guide plate 110G.

[Second Light-Transmissive Member 52]

The second light-transmissive member 52 is light-transmissive as is the first light-transmissive member 30, and covers at least the upper surface 120a (see FIG. 8) of the light-emitting element 120. In the configuration illustrated in FIG. 10, the second light-transmissive member 52 covers the entire side surface 120c of the light-emitting element 120 in addition to the upper surface 120a of the light-emitting element 120.

The material of the second light-transmissive member 52 may be a silicone resin, a modified silicone resin, an epoxy resin, a modified epoxy resin, a urea resin, a phenol resin, a polycarbonate resin, a trimethyl pentene resin, a polynorbornene resin, an acrylic resin, a urethane resin or a fluorine resin, or a resin containing two or more of these resins. In order to efficiently introduce light into the first light-transmissive member 30, it is advantageous if the material of the second light-transmissive member 52 has a lower refractive index than that of the first light-transmissive member 30. When a material having a refractive index different from that of the base material is dispersed in the material of the second light-transmissive member 52, it is possible to impart a light-diffusing function to the second light-transmissive member 52. For example, particles of titanium dioxide, silicon oxide, or the like, may be dispersed in the base material of the second light-transmissive member 52.

The second light-transmissive member 52 may include particles of a phosphor, etc. The phosphor in the second light-transmissive member 52 absorbs at least a portion of the light emitted from the light-emitting element 120 and emits light of a wavelength that is different from the wavelength of the light from the light-emitting element 120. In this case, the second light-transmissive member 52 is capable of converting the wavelength of a portion of blue light from the light-emitting element 120 to emit yellow light, for example. With such a configuration, white light can be obtained by mixing the blue light that has passed through the second light-transmissive member 52 and the yellow light emitted from the phosphor contained in the second light-transmissive member 52.

In the configuration illustrated in FIG. 10, the light emitted from the light-emitting element 120 is basically introduced into the light guide plate 110G through the second light-transmissive member 52. Therefore, light after color mixing is diffused inside the light guide plate 110G, and it is possible to extract, for example, white light with suppressed brightness non-uniformity from the upper surface 110a of the light guide plate 110G. The present embodiment is more advantageous for achieving light uniformity as compared to the case in which light is diffused inside the light guide plate and then subjected to wavelength conversion.

A material known in the art may be used as the phosphor to be dispersed in the second light-transmissive member 52. Examples of the phosphor include fluoride-based phosphors such as KSF-based phosphors, nitride-based phosphors such as CASN, YAG-based phosphors, β-SiAlON phosphors, etc. KSF-based phosphors and CASN are examples of wavelength conversion materials that convert blue light into red light, and YAG-based phosphors are examples of wavelength conversion materials that convert blue light into yellow light. β-SiAlON phosphors are examples of wavelength conversion materials that convert blue light into green light. The phosphor may be a quantum dot phosphor.

It is not necessary that the phosphor contained in the second light-transmissive member 52 is the same phosphor between the plurality of light sources 50G included in the surface light source. That is, the phosphor to be dispersed in the base material of the second light-transmissive member 52 may differ between the plurality of light-emitting regions 100G. For example, a phosphor that converts incident blue light into yellow light may be introduced into the second light-transmissive member 52 of the light source 50G for some of the plurality of light-emitting regions 100G included in a single surface light source 200, and a phosphor that converts incident blue light into green light may be introduced into the second light-transmissive member 52 of the light source 50G for some other light-emitting regions 100G. Moreover, a phosphor that converts incident blue light into red light may be introduced into the second light-transmissive member 52 of the light source 50G for the remaining light-emitting regions 100G.

[Cover Member 54]

The cover member 54 is a member that covers at least a portion of a lower surface 120b opposite to the upper surface 120a of the light-emitting element 120. For example, in the example shown in FIG. 10, the cover member 54 also covers the surface that is located on the opposite side of the second light-transmissive member 52 from the upper surface 52a. Note that the lower surface of the electrode 124 of the light-emitting element 120 is exposed from the cover member 54 and is connected to the wiring layer 141 of the wiring substrate 140 by the via 40.

The cover member 54 is typically light-reflective. The material of the cover member 54 may be a white resin material containing a light-reflective filler, for example, as in the first light-reflective member 31 described above. The material of the cover member 54 may be the same as or different from the material of the first light-reflective member 31.

By covering the lower surface 120b of the light-emitting element 120 except for the lower surface of the electrode 124 with the cover member 54, a portion of light emitted from the element body 125 of the light-emitting element 120 that is directed to the lower surface 120b of the light-emitting element 120 can be reflected by the cover member 54 toward the upper surface 110a of the light guide plate 110G, for example. That is, by providing the cover member 54 on the light source 50G, the light utilization efficiency can be improved.

[Second Light-Reflective Member 56]

As shown in FIG. 10, the second light-reflective member 56 can be arranged on the upper surface 52a of the second light-transmissive member 52. In this example, the second light-reflective member 56 covers the entire upper surface 52a of the second light-transmissive member 52.

An example of the material of the second light-reflective member 56 is a material similar to that of the first light-reflective member 31 or the cover member 54, e.g., a resin material containing particles of titanium dioxide. By arranging the layer-like second light-reflective member 56 above the light-emitting element 120, it is possible to prevent the brightness from being significantly high in a region of the light-emitting surface of the light-emitting region 100G that is directly above the light-emitting element 120. In other words, it is possible to effectively suppress brightness non-uniformity on the light-emitting surface of the light-emitting region 100G.

By further arranging the first light-reflective member 31 on the first light-transmissive member 30, it is possible to more effectively reduce the brightness difference between a region of the light-emitting surface of the light-emitting region 100G that is directly above the light-emitting element 120 and a position that is away from the light-emitting element 120. As with the first light-reflective member 31, it is not necessary that the second light-reflective member 56 completely blocks the light from the light source 50G, as long as it is capable of appropriately scattering the light emitted from the light-emitting element 120, thereby appropriately decreasing the brightness directly above the light-emitting element 120.

(Variations of Light Source)

Other light source examples that may be applied to surface light sources according to the embodiments of the present disclosure will now be described. A light source 50A shown in FIG. 13 includes the light-emitting element 120, a second light-transmissive member 52A, a cover member 54A and a second light-reflective member 56A.

In the light source 50A, the second light-transmissive member 52A is plate-shaped, and covers the upper surface 120a of the light-emitting element 120 and the upper surface 54a of the cover member 54A. The second light-transmissive member 52A may be formed from an inorganic material such as silicate glass, borosilicate glass or quartz glass or sapphire. The second light-reflective member 56A is typically a light-reflective resin layer and is formed on the upper surface 52a of the second light-transmissive member 52A.

In this example, the cover member 54A covers the entire side surface 120c of the light-emitting element 120 and a region of the lower surface 120b other than the region in which the electrode 124 is arranged. The lower surface 124b of the electrode 124 is exposed from the cover member 54A and aligned with the lower surface 54b of the cover member 54A.

The cover member 54A is typically white and light-reflective. As the cover member 54A covers the entire side surface 120c of the light-emitting element 120, light from the light-emitting element 120 is extracted primarily from the upper surface 120a of the light-emitting element 120. As the second light-reflective member 56A is located on the upper surface 52a of the second light-transmissive member 52A, most of the light emitted from the light-emitting element 120 is emitted from a side surface 52c of the second light-transmissive member 52A to the outside of the light source 50A. With such a light source configuration, light can be easily diffused across the plane of the light guide plate, thereby advantageously suppressing brightness non-uniformity.

Figure 13:
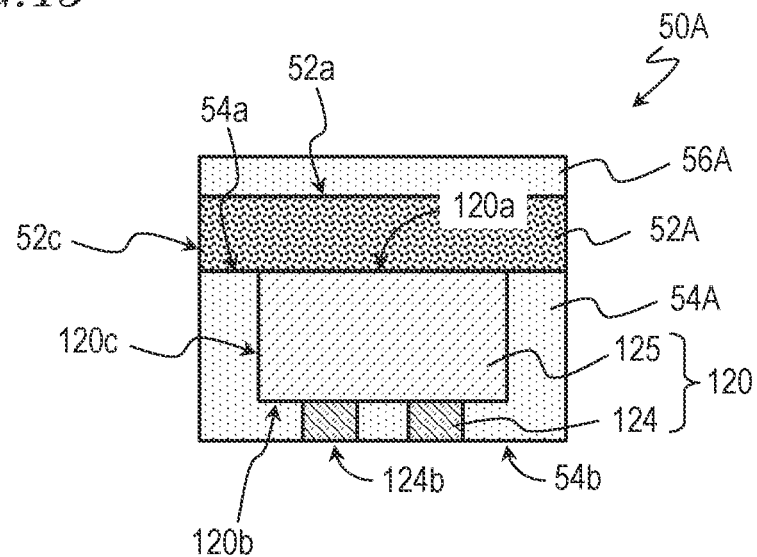
FIG. 13 is a schematic cross-sectional view showing another example of a light source that can be applied to a surface light source according to an embodiment of the present disclosure.

In the structure as illustrated in FIG. 13, the light-emitting element 120 can be attached to the second light-transmissive member 52A by a light-transmissive adhesive. In this case, a portion of the light-transmissive adhesive may be located on the side surface 120C of the light-emitting element 120. The cover member 54A also covers a portion of the light-transmissive adhesive that is located on the side surface 120c of the light-emitting element 120.

Figure 14:
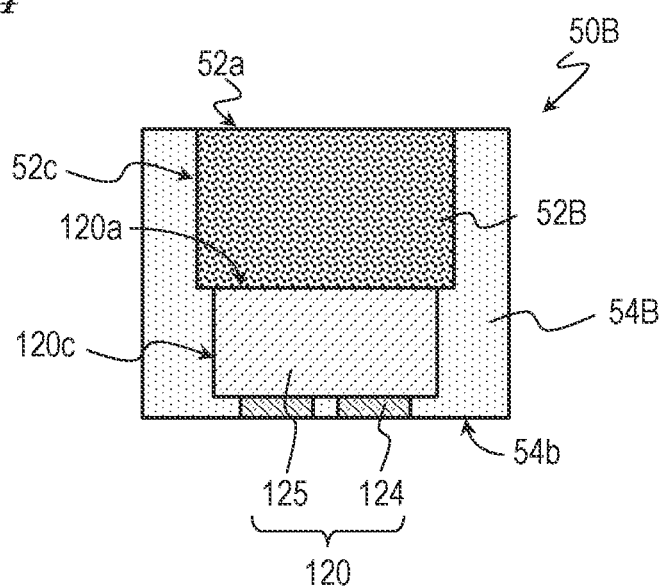
FIG. 14 is a schematic cross-sectional view showing yet another example of a light source that can be applied to a surface light source according to an embodiment of the present disclosure.

FIG. 14 shows yet another example of a light source that may be applied to surface light sources according to the embodiments of the present disclosure. As compared to the light source 50A shown in FIG. 13, a light source 50B shown in FIG. 14 includes a second light-transmissive member 52B and a cover member 54B instead of the second light-transmissive member 52A and the cover member 54A. The cover member 54B covers not only the side surface 120c of the light-emitting element 120, but also the side surface 52c of the second light-transmissive member 52B. The light source 50B does not have a light-reflective structure covering the upper surface 52a of the second light-transmissive member 52B, and the upper surface 52a of the second light-transmissive member 52B is exposed from the cover member 54B. With such a configuration, light can easily be extracted upward of the light-emitting element 120.

The light source 50B shown in FIG. 14 does not include a second light-reflective member that is located above the light-emitting element 120. As illustrated in FIG. 14, it is not necessary that the light source have a second light-reflective member above the light-emitting element 120. A light source 50C shown in FIG. 15 and a light source 50D shown in FIG. 16 are an example in which the second light-reflective member 56 is omitted from the light source 50G shown in FIG. 10, etc., and an example in which the second light-reflective member 56A is omitted from the light source 50A shown in FIG. 13, respectively. Conversely, if the light source includes a second light-reflective member, the first light-reflective member 31 on the first light-transmissive member 30 may be omitted.

Figure 15:
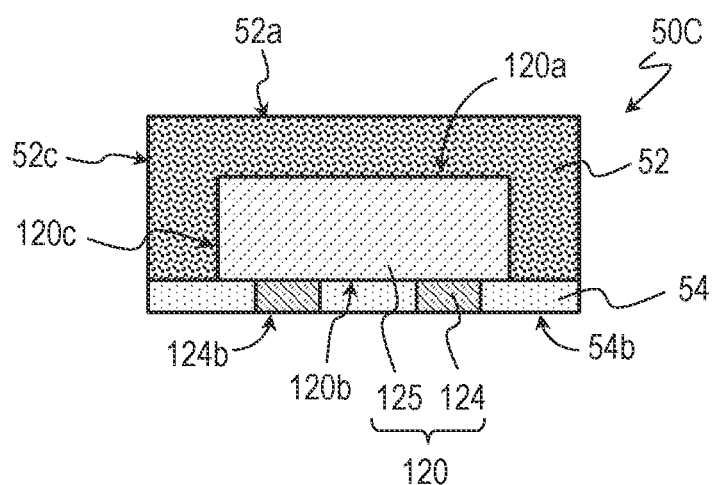
FIG. 15 is a schematic cross-sectional view showing yet another example of a light source that can be applied to a surface light source according to an embodiment of the present disclosure.
Figure 16:
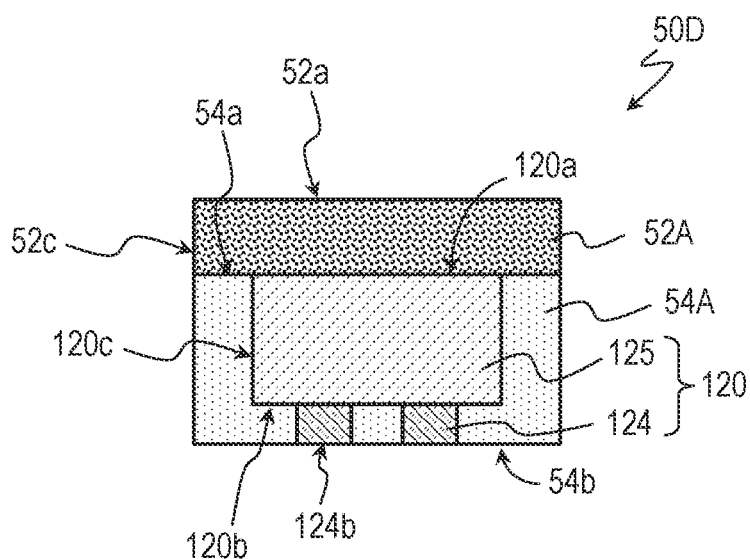
FIG. 16 is a schematic cross-sectional view showing yet another example of a light source that can be applied to a surface light source according to an embodiment of the present disclosure.

Note that a configuration in which the cover member 54 is further omitted from the light source 50C shown in FIG. 15 may also be employed for the light source arranged inside the through hole 10 of the light guide plate. That is, a configuration in which the cover member 54 is not located on the side surface of the electrode 124 of the light-emitting element 120 can also be applied to the light source in the surface light source 200 of the embodiment of the present disclosure.

Figure 17:
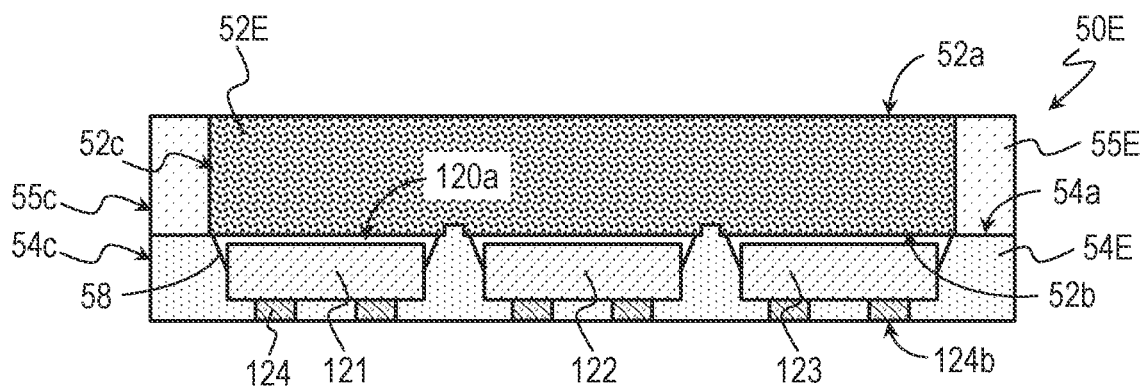
FIG. 17 is a schematic cross-sectional view showing yet another example of a light source that can be applied to a surface light source according to an embodiment of the present disclosure.

As shown in FIG. 17, a single light source may include a plurality of light-emitting elements. A light source 50E shown in FIG. 17 includes a first light-emitting element 121, a second light-emitting element 122 and a third light-emitting element 123. The light source 50E further includes a second light-transmissive member 52E, an attachment member 58, a first cover member 54E and a second cover member 55E.

The first light-emitting element 121, the second light-emitting element 122 and the third light-emitting element 123 can be light-emitting elements having different peak emission wavelengths from each other. For example, the first light-emitting element 121, the second light-emitting element 122 and the third light-emitting element 123 may be an LED emitting blue light, an LED emitting green light and an LED emitting red light, respectively. With such a combination of light-emitting elements, the light source 50E can be used as a light source that emits white light.

In the example shown in FIG. 17, the first light-emitting element 121, the second light-emitting element 122 and the third light-emitting element 123 are arranged straight in a single row. However, the arrangement of the light-emitting elements in the light source 50E is not limited to this example. The number of light-emitting elements included in the light source 50E and the combination of peak emission wavelengths can also be changed as appropriate, depending on the application of the surface light source.

In the configuration illustrated in FIG. 17, the second light-transmissive member 52E is located above the first light-emitting element 121, the second light-emitting element 122 and the third light-emitting element 123 to collectively cover the upper surfaces 120a of these light-emitting elements. In this example, the first light-emitting element 121, the second light-emitting element 122, and the third light-emitting element 123 are secured to a lower surface 52b of the second light-transmissive member 52E by the attachment member 58. The attachment member 58 is, for example, a light-transmissive adhesive.

In the light source 50E, light with different peak wavelengths is mixed inside the second light-transmissive member 52E. It is advantageous if a light-diffusing material (e.g., particles of titanium dioxide, silicon oxide, etc.) is dispersed in the second light-transmissive member 52E to thereby impart a light-diffusing function to the second light-transmissive member 52E. The second light-transmissive member 52E may or may not contain particles of a phosphor.

The first cover member 54E is a light-reflective member that covers these light-emitting elements and the attachment member 58, except for the lower surface 124b of the electrode 124 of each light-emitting element. The second cover member 55E is located on the upper surface 54a of the first cover member 54E, and covers the sides 52C of the second light-transmissive member 52E so as to surround the second light-transmissive member 52E. The second cover member 55E is light-reflective, as is the first cover member 54E, and light from the first light-emitting element 121, the second light-emitting element 122 and the third light-emitting element 123 is extracted to the outside of the light source 50E from the upper surface 52a of the second light-transmissive member 52E. Note that in this example, a side surface 55c of the second cover member 55E coincides with a side surface 54c of the first cover member 54E.

The light source example described above in the second embodiment may be combined with any of the light-emitting regions 100A to 100F described above with reference to FIGS. 2 to 7, as well as the light-emitting region 100G or 100F.

(Illustrative Method for Manufacturing Surface Light Source)

An example method for manufacturing a surface light source of the second embodiment will be briefly described below. Here, an illustrative method for manufacturing a surface light source including the light-emitting region 100G shown in FIG. 10 will be described.

First, the light guide plate 210 having the through hole 10 and the plurality of protruding portions 110d formed on the upper surface 210a and the wiring substrate 240 are prepared. The shape of the light guide plate 210 can be obtained by molding using a mold, for example. That is, a plurality of protruding portions and/or depressed portions can be formed on the upper surface 210a of the light guide plate 210 in accordance with the shape of the inside of the cavity of the mold. Alternatively, the shape of the protruding portions and/or depressed portions can be obtained by applying a resist on the surface of the light guide plate, and then patterning the resist using photolithography. The through holes 10 can be formed by using a drill, by punching, or the like. Note that the light guide plate 210 and/or the wiring substrate 240 may be prepared by purchase.

Next, a layered sheet including the adhesive sheet 170, the light-reflective sheet 160 and the adhesive sheet 150 layered in this order is prepared, and the layered sheet is attached to the wiring substrate 240 so that the surface on the adhesive sheet 170 side opposes the upper surface of the wiring substrate 240. Then, through holes to be the vias 40 are formed at predetermined positions of the wiring substrate 240 to which the layered sheet is attached. These through holes can be formed by using a laser or a drill, by punching, or the like.

Next, the wiring substrate 240 and the light guide plate 110G are attached together by the adhesive sheet 150. Then, the light source 50G is arranged in each through hole 10 of the light guide plate 110G, and the light source 50G in the through hole 10 is sealed with the first light-transmissive member 30G. Before or after the step of sealing the light source 50G with the first light-transmissive member 30G, the light guide plate is scraped using a dicing blade, for example, thereby forming the first groove 70.

After the formation of the first groove 70, the partition member 72 is formed inside the first groove 70 by spraying, printing, dripping, or the like. In this process, the first light-reflective member 31 may be formed on the first light-transmissive member 30G in parallel with the formation of the partition member 72. In this case, the partition member 72 and the first light-reflective member 31 can be formed from the same material.

Figure 18:
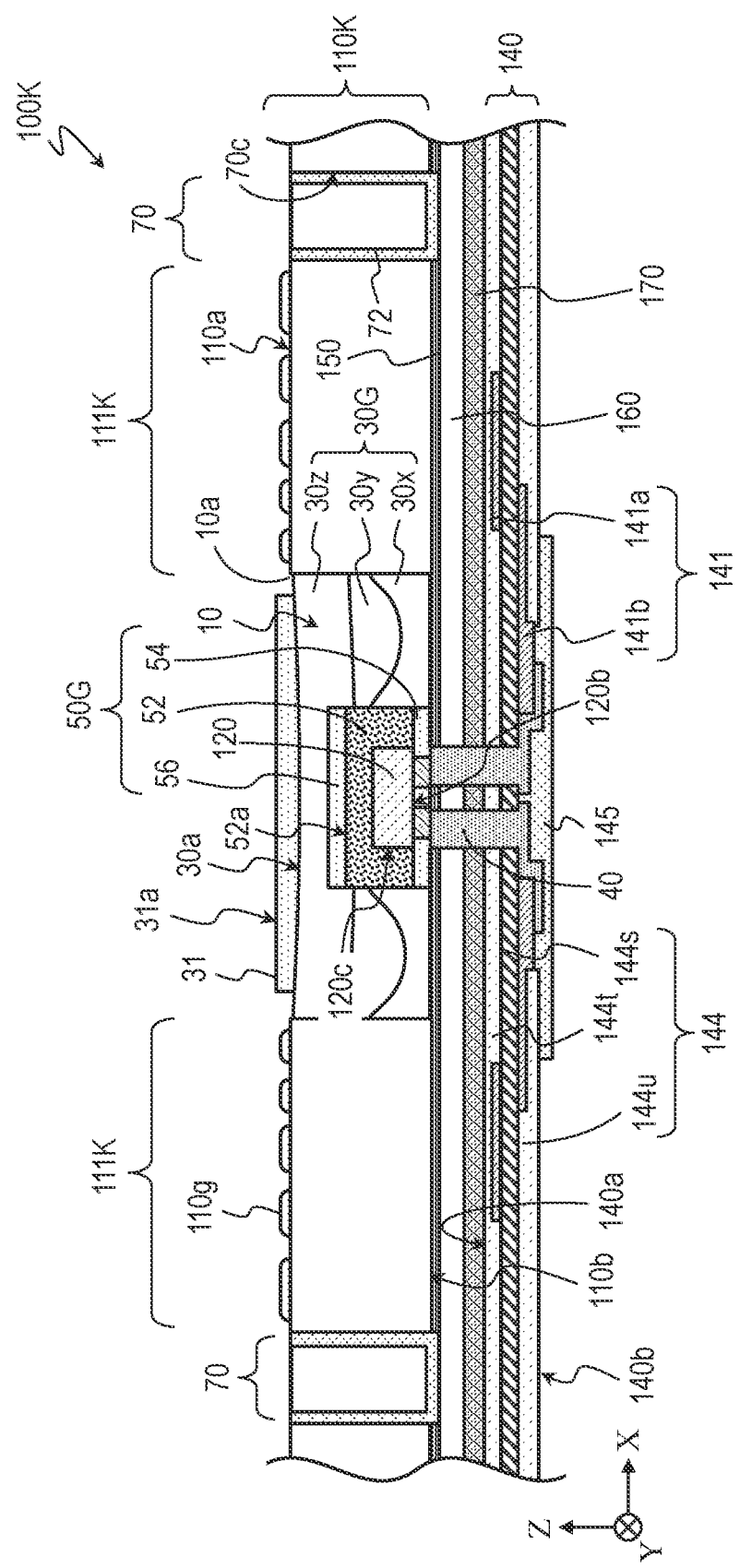
FIG. 18 is a schematic cross-sectional view showing a variation of the surface light source.

Moreover, in this process, a light-reflective material similar to the material of the partition member 72 may be applied on the first region of the upper surface of the light guide plate. By curing the material applied on the upper surface of the light guide plate, it is possible to form a plurality of protruding portions 110g from the light-reflective material, for example, as schematically shown in FIG. 18. The protruding portions 110g may each have a dot-like or ring-like shape in a plan view. A light-emitting region 100K shown in FIG. 18 includes, as a part thereof, a light guide plate 110K having a plurality of protruding portions 110g formed from a light-reflective material in a first region 111K on the upper surface 110a side. The protruding portions 110g may have a height of about 0.02 mm or more and 0.05 mm or less with respect to the position of the upper surface 110a of the light guide plate 110K.

Next, a conductive paste is arranged inside the through hole provided in the wiring substrate 240. In this process, a portion of the conductive paste is also arranged on the second wiring layer 141b. By curing the conductive paste, it is possible to form the via 40 that electrically connects together the electrode 124 of the light-emitting elements 120 in the light source 50G and the wiring layer 141. Then, a protection member 145 covering the via 40 is formed from an insulating material. Through these steps, a surface light source having the light-emitting region 100G is obtained.

The embodiments of the present disclosure are applicable to various lighting light sources, on-vehicle light sources, display light sources, and the like. They are particularly advantageously applicable to a backlight unit directed to a liquid crystal display device. The surface light sources according to the embodiments of the present disclosure are suitably applicable to backlights of display devices of mobile devices with strict requirements for smaller thicknesses, surface light-emitting devices that are capable of being controlled by local dimming, and the like.

The above disclosed subject matter shall be considered illustrative, and not restrictive, and the appended claims are intended to cover all modifications, enhancements, and other embodiments that fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

What is claimed is:

1. A surface light source comprising:
a light guide plate having an upper surface and a lower surface located opposite the upper surface, and comprising at least one through hole extending from the upper surface to the lower surface;
a wiring substrate located on a lower surface side of the light guide plate and comprising a wiring layer; and
at least one light source comprising a light-emitting element electrically connected to the wiring layer of the wiring substrate, wherein:
the light source is located inside the through hole;
the upper surface of the light guide plate has a first region including a plurality of depressed portions, the first region comprising:
an outer region, and
an inner region that is located closer to the light source than is the outer region;
the plurality of depressed portions include:
a first depressed portion in the inner region, and
a second depressed portion in the outer region, wherein:
in a cross-sectional view, an opening of the second depressed portion is larger than an opening of the first depressed portion, and a depth of the second depressed portion is greater than a depth of the first depressed portion; and
in a plan view, an arrangement pitch of the depressed portions decreases in a direction away from the light source.

2. The surface light source according to claim 1, wherein:
the upper surface of the light guide plate further comprises a second region that is flat and surrounds the through hole; and
the first region is located outside the second region and surrounds the second region.

3. The surface light source according to claim 1, wherein each of the depressed portions has a circular shape in a plan view.

4. The surface light source according to claim 2, wherein each of the depressed portions has a circular shape in a plan view.

5. The surface light source according to claim 1, wherein a number density of the depressed portions increases in the direction away from the light source.

6. The surface light source according to claim 2, wherein a number density of the depressed portions increases in the direction away from the light source.

7. The surface light source according to claim 3, wherein a number density of the depressed portions increases in the direction away from the light source.

8. The surface light source according to claim 1, further comprising:
at least one first light-transmissive member; and
at least one first light-reflective member, wherein:
the through hole is filled with the first light-transmissive member; and
the first light-reflective member covers a surface of the first light-transmissive member that is located on an upper surface side of the light guide plate.

9. The surface light source according to claim 2, further comprising:
at least one first light-transmissive member; and
at least one first light-reflective member, wherein:
the through hole is filled with the first light-transmissive member; and
the first light-reflective member covers a surface of the first light-transmissive member that is located on an upper surface side of the light guide plate.

10. The surface light source according to claim 3, further comprising:
at least one first light-transmissive member; and
at least one first light-reflective member, wherein:
the through hole is filled with the first light-transmissive member; and
the first light-reflective member covers a surface of the first light-transmissive member that is located on an upper surface side of the light guide plate.

11. The surface light source according to claim 4, further comprising:
at least one first light-transmissive member; and
at least one first light-reflective member, wherein:
the through hole is filled with the first light-transmissive member; and
the first light-reflective member covers a surface of the first light-transmissive member that is located on an upper surface side of the light guide plate.

12. The surface light source according to claim 1, wherein:
the light-emitting element has an upper surface; and
the light source includes a second light-transmissive member that covers the upper surface of the light-emitting element.

13. The surface light source according to claim 2, wherein:
the light-emitting element has an upper surface; and
the light source includes a second light-transmissive member that covers the upper surface of the light-emitting element.

14. The surface light source according to claim 12, wherein the light source comprises a cover member that covers at least a portion of a lower surface of the light-emitting element opposite to the upper surface of the light-emitting element.

15. The surface light source according to claim 1, wherein the light guide plate comprises one or more first grooves that are open on at least one of the upper surface or the lower surface of the light guide plate, and the one or more first grooves surround the light source in a plan view.

16. The surface light source according to claim 15, further comprising a light-reflective partition member that covers at least an inner surface that defines a shape of each of the one or more first grooves.

17. The surface light source according to claim 2, wherein the light guide plate comprises one or more first grooves that are open on at least one of the upper surface or the lower surface of the light guide plate, and the one or more first grooves surround the light source in a plan view.

18. The surface light source according to claim 17, further comprising a light-reflective partition member that covers at least an inner surface that defines a shape of each of the one or more first grooves.

19. The surface light source according to claim 1, further comprising a light-reflective sheet arranged between the lower surface of the light guide plate and the wiring substrate.

20. The surface light source according to claim 1, wherein:
the at least one light source comprises a plurality of light sources;

the at least one through hole comprises a plurality of through holes; and each of the plurality of light sources is arranged inside a corresponding one of the plurality of through holes.

\* \* \* \* \*